(12) United States Patent
Benning et al.

(10) Patent No.: US 12,075,535 B2
(45) Date of Patent: Aug. 27, 2024

(54) LOAD CONTROL DEVICE CONFIGURED TO OPERATE IN TWO-WIRE AND THREE-WIRE MODES

(71) Applicant: Lutron Technology Company LLC, Coopersburg, PA (US)

(72) Inventors: Mark A. Benning, Allentown, PA (US); Thomas W. Brenner, Mertztown, PA (US); Quinn Brogan, Hellertown, PA (US); Donald F. Hausman, Jr., New Tripoli, PA (US); Peter MacLellan, Cambridge, MA (US); Matthew Kyle Olsen, Allentown, PA (US); Matthew Pennock, Bridgeton, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/186,497

(22) Filed: Mar. 20, 2023

(65) Prior Publication Data

US 2023/0232515 A1 Jul. 20, 2023

Related U.S. Application Data

(63) Continuation of application No. 17/208,950, filed on Mar. 22, 2021, now Pat. No. 11,641,704, which is a
(Continued)

(51) Int. Cl.
*H05B 45/37* (2020.01)
*H02M 1/08* (2006.01)
(Continued)

(52) U.S. Cl.
CPC .............. *H05B 45/37* (2020.01); *H02M 1/08* (2013.01); *H02M 7/217* (2013.01); *H05B 45/10* (2020.01); *H05B 45/31* (2020.01)

(58) Field of Classification Search
CPC ........ H05B 45/37; H05B 45/10; H05B 45/31; H02M 1/08; H02M 7/217
See application file for complete search history.

(56) References Cited

U.S. PATENT DOCUMENTS 5,248,919 A 9/1993 Hanna et al.
6,091,205 A 7/2000 Newman, Jr. et al.
(Continued)

OTHER PUBLICATIONS

Bob Newman—Consultant, R TIS S Operation "Real-Time Illumination System for phase-control dimmers," Technical White paper, Jun. 1999 Version 2.

*Primary Examiner* — Emily P Pham
(74) *Attorney, Agent, or Firm* — Michael S. Czarnecki; Glen R. Farbanish; Philip N. Smith

(57) ABSTRACT

A load control device coupled between an AC power source and an electrical load may operate in a three-wire mode or a two-wire mode based on whether the load control device is connected to a neutral side of the AC power source. The load control device may further comprise first and second zero-cross detect circuits to be respectively used in the two-wire mode or the three-wire mode, and a neutral wire detect circuit configured to generate a neutral-wire detect signal indicating whether the load control device is connected to the neutral side of the AC power source. A control circuit of the load control device may determine whether the load control device should operate in the two-wire mode or in the three-wire mode in response to the neutral-wire detect signal.

18 Claims, 11 Drawing Sheets

Related U.S. Application Data continuation of application No. 16/696,618, filed on Nov. 26, 2019, now Pat. No. 10,959,307.

(60) Provisional application No. 62/832,476, filed on Apr. 11, 2019, provisional application No. 62/826,406, filed on Mar. 29, 2019, provisional application No. 62/773,803, filed on Nov. 30, 2018.

(51) Int. Cl.
*H02M 7/217* (2006.01)
*H05B 45/10* (2020.01)
*H05B 45/31* (2020.01)

(56) References Cited

U.S. PATENT DOCUMENTS

| | | |
|---|---|---|
| 6,969,959 B2 | 11/2005 | Black et al. |
| 7,190,124 B2 | 3/2007 | Kumar et al. |
| 7,190,125 B2 | 3/2007 | McDonough et al. |
| 7,242,150 B2 | 7/2007 | DeJonge et al. |
| 7,259,524 B2 | 8/2007 | Hausman, Jr. et al. |
| 7,342,764 B2 | 3/2008 | Black |
| 7,546,473 B2 | 6/2009 | Newman |
| 8,208,235 B2 | 6/2012 | Orchowski |
| 8,664,881 B2 | 3/2014 | Newman, Jr. et al. |
| 8,729,814 B2 | 5/2014 | Salvestrini |
| 9,160,224 B2 | 10/2015 | Newman, Jr. et al. |
| 9,489,005 B2 | 11/2016 | Hausman, Jr. et al. |
| 10,123,393 B1 | 11/2018 | Soto et al. |
| 10,201,064 B1 | 2/2019 | Soto et al. |
| 10,340,692 B2 | 7/2019 | Testani |
| 10,959,307 B2 | 3/2021 | Benning et al. |
| 2003/0178892 A1 | 9/2003 | Black et al. |
| 2008/0094010 A1 | 4/2008 | Black |
| 2011/0058296 A1 | 3/2011 | Orchowski |
| 2011/0193490 A1 | 8/2011 | Kumar |
| 2014/0077718 A1 | 3/2014 | Zotter et al. |
| 2016/0124453 A1 | 5/2016 | Blakeley et al. |
| 2017/0223812 A1 | 8/2017 | Zotter et al. |

LOAD CONTROL DEVICE CONFIGURED TO OPERATE IN TWO-WIRE AND THREE-WIRE MODES

CROSS-REFERENCE TO RELATED APPLICATIONS

This application is a continuation of U.S. patent application Ser. No. 17/208,950, filed Mar. 22, 2021; which is a continuation of U.S. patent application Ser. No. 16/696,618, filed on Nov. 26, 2019, now U.S. Pat. No. 10,959,307 issued Mar. 23, 2021; which claims priority to U.S. Provisional Patent Application No. 62/832,476, filed Apr. 11, 2019, U.S. Provisional Patent Application No. 62/826,406, filed Mar. 29, 2019, and U.S. Provisional Patent Application No. 62/773,803, filed Nov. 30, 2018, the disclosures of which are incorporated herein by reference in their entireties.

BACKGROUND

Prior art load control devices, such as dimmer switches, may be coupled in series electrical connection between an alternating-current (AC) power source and a lighting load for controlling the amount of power delivered from the AC power source to the lighting load. A standard dimmer switch may typically comprise a bidirectional semiconductor switch, e.g., a thyristor (e.g., such as a triac) or two field-effect transistors (FETs) in anti-series connection. The bidirectional semiconductor switch may be coupled in series between the AC power source and the load and is controlled to be conductive and non-conductive for portions of a half cycle of the AC power source to thus control the amount of power delivered to the electrical load. Generally, dimmer switches may use either a forward phase-control dimming technique or a reverse phase-control dimming technique in order to control when the bidirectional semiconductor switch is rendered conductive and non-conductive to thus control the power delivered to the load. The dimmer switch may comprise a toggle actuator for turning the lighting load on and off and an intensity adjustment actuator for adjusting the intensity of the lighting load. Examples of prior art dimmer switches are described in greater detail is commonly-assigned U.S. Pat. No. 5,248,919, issued Sep. 29, 1993, entitled LIGHTING CONTROL DEVICE; and U.S. Pat. No. 6,969,959, issued Nov. 29, 2005, entitled ELECTRONIC CONTROL SYSTEMS AND METHODS; the entire disclosures of which are incorporated by reference herein.

In order to save energy, high-efficiency lighting loads, such as, for example, light-emitting diode (LED) light sources, are being used in place of or as replacements for conventional incandescent or halogen lamps. High-efficiency light sources typically consume less power and provide longer operational lives as compared to incandescent and halogen lamps. In order to illuminate properly, a load regulation circuit (e.g., such as an electronic dimming ballast or an LED driver) may be coupled between the AC power source and the respective high-efficiency light source (e.g., the compact fluorescent lamp or the LED light source) for regulating the power supplied to the high-efficiency light source. Some high-efficiency lighting loads may be integrally housed with the load regulation circuit in a single enclosure. Such an enclosure may have a screw-in base that allows for mechanical attachment to standard Edison sockets and provide electrical connections to the neutral side of the AC power source and either the hot side of the AC power source or the dimmed-hot terminal of the dimmer switch (e.g., for receipt of the phase-control voltage).

A dimmer switch for controlling a high-efficiency light source may be coupled in series between the AC power source and the load regulation circuit for the high-efficiency light source. Such a dimmer switch may operate in a two-wire mode or a three-wire mode, depending on whether the dimmer switch includes a neutral terminal and/or whether the neutral terminal is connected to a neutral side of the AC source. The load regulation circuit may control the intensity of the high-efficiency light source to the desired intensity in response to the conduction time of the bidirectional semiconductor switch of the dimmer switch.

SUMMARY

As described herein, a load control device for controlling power delivered from an AC power source to an electrical load may comprise a hot terminal, a dimmer-hot terminal, and a neutral terminal. The hot terminal may be adapted to be electrically coupled to a hot side of the AC power source. The dimmed-hot terminal may be adapted to be electrically coupled to the electrical load while the neutral terminal may be optionally connected to a neutral side of the AC power source. The load control device may further comprise a first zero-cross detect circuit, a second zero-cross detect circuit, and a neutral wire detect circuit. The first and second zero-cross detect circuits may be configured to detect a zero-crossing point of an AC mains line voltage generated by the AC power source, and the neutral wire detect circuit may be configured to generate, based on a current conducted through the second zero-cross detect circuit, a neutral-wire detect signal indicating whether the neutral terminal is connected to the neutral side of the AC power source.

A control circuit of the load control device may determine whether the load control device should operate in a two-wire mode or a three-wire mode based on the neutral wire detect signal, wherein the two-wire mode may correspond to the neutral terminal not being connected to the neutral side of the AC power source and the three-wire mode may correspond to the neutral terminal being connected to the neutral side of the AC power source. The control circuit may determine the zero-crossing points of the AC mains line voltage in response to the first zero-cross detect circuit in the two-wire mode and in response to the second zero-cross detect circuit in the three-wire mode.

The second zero-cross detect circuit described above may comprise an active filter configured to remove one or more frequency components of the AC mains line voltage that are above a frequency threshold. The active filter may be configured as a full-wave filter circuit or a half-wave filter circuit. When configured as a half-wave filter circuit, the active filter may be characterized by one or more of the following. The active filter may be powered by a same power supply that also powers the control circuit and/or other components of the load control device. The active filter may be referenced to circuit common. The active filter may be configured to conduct a current through the electrical load only during negative half-cycles of the AC mains line voltage.

Also described herein is a load control device coupled between an AC power source and an electrical load. The load control device may comprise a hot terminal, a dimmer-hot terminal and a neutral terminal. The load control device may further comprise a power supply capable of conducting a charging current through the electrical load and a switching circuit configured to be rendered conductive and non-conductive to control when the charging current is conducted through the electrical load.

A control circuit of the load control device may determine whether the load control device should operate in a two-wire mode or a three-wire mode, wherein the two-wire mode may correspond to the neutral terminal not being connected to the neutral side of the AC power source and wherein the three-wire mode may correspond to the neutral terminal being connected to the neutral side of the AC power source. Upon determining that the load control device should operate in the two-wire mode, the control circuit may render the switching circuit conductive to allow the charging current to be conducted through the electrical load during positive half-cycles of an AC mains line voltage generated by the AC power source. Upon determining that the load control device should operate in the three-wire mode, the control circuit may render the switching circuit non-conductive to prevent the charging current from being conducted through the electrical load during the positive half-cycles of the AC mains line voltage.

In addition, a load control device configured to execute a plurality of different power supply protection techniques (e.g., when operating in the two-wire mode and/or when using a reverse phase-control dimming technique) is also described herein. The load control device may be configured to control power delivered from an AC power source to an electrical load. The load control device may comprise a controllably conductive device adapted to be coupled in series with the electrical load, and a control circuit configured to render the controllably conductive device conductive and non-conductive to control a load current conducted through the electrical load. The control circuit may be configured to adjust an amount of power delivered to the electrical load by adjusting a present phase angle of the controllably conductive device between a low-end phase angle and a high-end phase angle. The load control device may comprise a power supply configured to receive a rectified voltage and to generate a supply voltage for powering the control circuit by conducting a charging current through the electrical load when the controllably conductive device is non-conductive. The power supply may comprise a bus capacitor configured to charge from the rectified voltage through a diode to generate a bus voltage. The control circuit may be configured to decrease the high-end phase angle when the magnitude of the rectified voltage is less than a first threshold, and decrease the present phase angle when the magnitude of the bus voltage is less than a second threshold.

DETAILED DESCRIPTION

Figure 1:
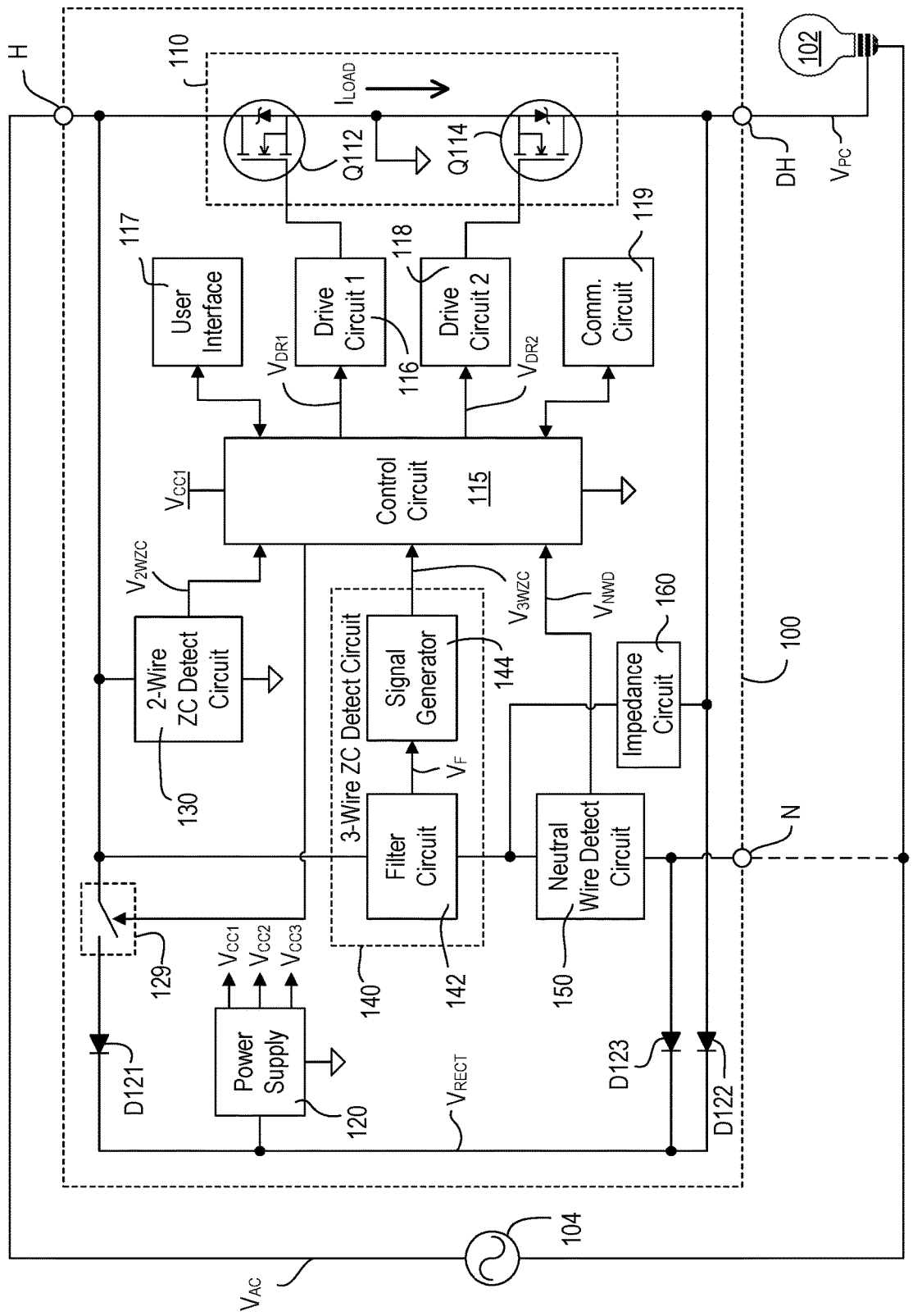
FIG. 1 is a simplified block diagram of an example load control device (e.g., a dimmer switch) for controlling the amount of power delivered to an electrical load, such as, a lighting load.

FIG. 1 is a simplified block diagram of an example load control device 100 (e.g., a dimmer switch) for controlling the amount of power delivered to an electrical load, such as, a lighting load 102. The load control device 100 may include a hot terminal H coupled to a hot side of an alternating-current (AC) power source 104 for receiving an AC mains line voltage $V_{AC}$, and a dimmed-hot terminal DH coupled to the lighting load 102. The load control device 100 may also include a neutral terminal N that may be adapted to be coupled (e.g., optionally coupled) to a neutral side of the AC power source 104. For example, the load control device 100 may be configured to operate in a two-wire mode when the neutral terminal N is not connected to the neutral side of the AC power source 104 and in a three-wire mode when the neutral terminal N is connected to the neutral side of the AC power source.

The load control device 100 may comprise a controllably conductive device 110, such as two field-effect transistors (FETs) Q112, Q114 that may be coupled in anti-series connection between the hot terminal and the dimmed-hot terminal DH. The junction of the FETs may be coupled to circuit common. The load control device 100 may comprise a control circuit 115, e.g., a digital control circuit, for controlling the FETs Q112, Q114 to conduct a load current $I_{LOAD}$ through the lighting load 102. The control circuit 115 may include one or more of a processor (e.g., a microprocessor), a microcontroller, a programmable logic device (PLD), a field programmable gate array (FPGA), an application specific integrated circuit (ASIC), or any suitable controller or processing device. The load control device 100 may comprise a memory (not shown) configured to store operational characteristics of the load control device. The memory may be implemented as an external integrated circuit (IC) or as an internal circuit of the control circuit 115.

The control circuit 115 may generate first and second drive signals $V_{DR1}$, $V_{DR2}$ that may be coupled to the gates of the respective FETs Q112, Q114 via first and second gate drive circuits 116, 118, respectively. When the controllably conductive device 110 is rendered conductive during the positive half-cycles of the AC power source 104, the load current $I_{LOAD}$ may be conducted through the drain-source channel of the first FET Q112 and the body diode of the second FET Q114. When the controllably conductive device 110 is rendered conductive during the negative half-cycles of the AC power source 104, the load current $I_{LOAD}$ may be conducted through the drain-source channel of the second FET Q114 and the body diode of the first FET Q112.

The load control device 100 may comprise a user interface 117, which may comprise, for example, one or more actuators (e.g., buttons) for receiving user inputs and/or one or more visual indicators for providing user feedback. For example, the user interface 117 may comprise a toggle actuator and an intensity adjustment actuator (e.g., such as a slider control or a pair of raise and lower buttons) for controlling the lighting load 102. The control circuit 115 may be configured to control the controllably conductive device 110 to control the amount of power delivered to the lighting load 102 in response to actuations of the actuators of the user interface 117. For example, the control circuit 115 may be configured to turn the lighting load 102 on and off in response to actuations of the toggle actuator. The control circuit 115 may also be configured to control the amount of power delivered to the lighting load 102 to adjust a desired intensity $L_{DES}$ of the lighting load between a high-end intensity $L_{HE}$ (e.g., 90-100%) and a low-end intensity $L_{LE}$ (e.g., 0.1-10%) in response to actuations of the intensity adjustment actuator. In addition, the user interface 117 may also comprise one or more light-emitting diodes (LEDs) for illuminating the visual indicators, for example, to provide a visual indication of a status and/or a present intensity of the lighting load 102, and/or a visual indication of a selected preset. For example, the user interface 117 may comprise a vertically-oriented linear array of visual indicators. The control circuit 115 may be coupled to the LEDs for illuminating the visual indicators of the user interface 117 to provide feedback.

The load control device 100 may comprise a communication circuit 119. The communication circuit 119 may comprise a wireless communication circuit, such as, for example, a radio-frequency (RF) transceiver coupled to an antenna for transmitting and/or receiving RF signals, an RF transmitter for transmitting RF signals, an RF receiver for receiving RF signals, or an infrared (IR) transmitter and/or receiver for transmitting and/or receiving IR signals. The communication circuit 119 may comprise a wired communication circuit configured to be coupled to a wired control link, for example, a digital communication link and/or an analog control link, such as a 0-10V control link or a pulse-width modulated (PWM) control link. In addition, the communication circuit 118 may be coupled to the electrical wiring connected to the load control device 100 for transmitting a control signal via the electrical wiring using, for example, a power-line carrier (PLC) communication technique. The control circuit 115 may be configured to turn the lighting load 102 on and off, and adjust the desired intensity $L_{DES}$ of the lighting load in response to messages (e.g., digital messages) received via the communication circuit 119.

The load control device 100 may include a power supply 120. The power supply 120 may generate first direct-current (DC) supply voltage $V_{CC1}$, e.g., for powering the control circuit 115 and the other low-voltage circuitry of the load control device 100, a second DC supply voltage $V_{CC2}$, e.g., for powering the drive circuits 116, 118 to drive the FETs Q112, Q114, and/or a third DC supply voltage $V_{CC3}$ (e.g., an isolated DC supply voltage). For example, the power supply 120 may comprise an isolated power supply, and may comprise a transformer for generating the third isolated DC supply voltage $V_{CC3}$. The power supply 100 may be configured to conduct a charging current through the dimmed-hot terminal DH and/or the neutral terminal N depending on whether the neutral terminal N is connected to the neutral side of the AC power source 104 or not. The load control device 100 may comprise a first diode D121 coupled between the hot terminal H and an input of the power supply 120, a second diode D122 coupled between the dimmed-hot terminal DH and the input of the power supply 120, and a third diode D123 coupled between the neutral terminal N and the input of the power supply 120. When the neutral terminal N is not connected to the neutral side of the power supply 120, the power supply 120 may be coupled to the AC power source 104 through a full-wave rectifier bridge that includes the first and second diodes D121, D122, and the body diodes of the FETs Q112, Q114. When the neutral terminal N is connected to the neutral side of the power supply 120, the power supply 120 may be coupled to the AC power source 104 through a full-wave rectifier bridge that includes the first and third diodes D121, D123, and the body diodes of the FETs Q112, Q114. The full-wave rectifier bridges (e.g., including the first diode D121, the second diode D122, the third diode D123, and/or the body diodes of the FETs Q112, Q114) may be configured to receive a voltage developed across the controllably conductive device 110 and to generate a rectified voltage $V_{RECT}$ at the input of the power supply.

The control circuit 115 may be configured to determine times of zero-crossing points of the AC mains line voltage $V_{AC}$ of the AC power source 104. The control circuit 115 may then render the FETs Q112, Q114 conductive and/or non-conductive at predetermined times (e.g., at a firing time or firing angle) relative to the zero-crossing points of the AC mains line voltage $V_{AC}$ to generate a phase-control voltage $V_{PC}$ using a phase-control dimming technique (e.g., a forward phase-control dimming technique and/or a reverse phase-control dimming technique). For example, the control circuit 115 may use the forward phase-control dimming technique to control inductive loads, and may use the reverse phase-control dimming technique to control capacitive loads. Examples of dimmers are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are incorporated by reference herein.

The control circuit 115 may be configured to adjust a phase angle (e.g., a conduction time) of the controllably conductive device 110 each half-cycle to control the amount of power delivered to the lighting load 102 and the intensity of the lighting load. For example, the control circuit 115 may be configured to adjust a present phase angle $\theta_{PRES}$ of the controllably conductive device 110 to adjust the intensity of the lighting load 102 to the desired intensity $L_{DES}$ (e.g., as set by the intensity adjustment actuator of the user interface 117). Using the forward phase-control dimming technique, the control circuit 115 may render the controllably conductive device 110 non-conductive at the beginning of each half cycle, and render the controllably conductive device conductive at a firing time (e.g., as determined from the present phase angle $\theta_{PRES}$) during the half cycle. Using the reverse phase-control dimming technique, the control circuit 115 may render the controllably conductive device 110 conductive at the beginning of each half cycle, and render the controllably conductive device non-conductive at a firing time (e.g., as determined from the present phase angle $\theta_{PRES}$) during the half cycle, after which the control circuit may maintain the controllably conductive device non-conductive for the rest of the half cycle.

The load control device 100 may be programmed by a user during installation to use the forward phase-control dimming technique or the reverse phase-control dimming technique during operation. For example, the user may set the phase-control dimming technique using an advanced programming mode. The control circuit 115 may be configured to enter the advanced programming mode in response to one or more actuations of the actuators of the user interface 117. A load control device having an advanced programming mode is described in greater detail in commonly-assigned U.S. Pat. No. 7,190,125, issued Mar. 13, 2007, entitled PROGRAMMABLE WALLBOX DIMMER, the entire disclosure of which is hereby incorporated by reference.

The control circuit 115 may employ a load detection process for determining a load type of lighting load 102 and use the phase-control dimming technique that is best suited for that load type. For example, the control circuit 115 may detect that the lighting load 102 is inductive, and may determine to use the forward phase-control dimming technique. For example, upon initial power up, the control circuit 115 may begin using the reverse phase-control dimming technique and may monitor the voltage across the lighting load 102 using a voltage monitor circuit (not shown) during the load detection process. In the event that the control circuit 115 detects an overvoltage condition (e.g., a voltage spike or ring-up condition) across the lighting load 102, the load control device may determine that the lighting load has inductive characteristics, and may begin using the forward phase-control dimming technique. Otherwise, the control circuit 115 may continue to use the reverse-phase control dimming technique. Similarly, upon initial power up, the control circuit 115 may begin using the forward phase-control dimming technique and may subsequently decide to switch to the reverse-phase control dimming technique (e.g., upon detecting that the lighting load has capacitive characteristics) or to continue to use the forward phase-control dimming technique. An example of a load control device that uses a load detection process is described in greater detail in commonly-assigned U.S. Pat. No. 9,489,005, issued Nov. 8, 2016, entitled METHOD AND APPARATUS FOR PHASE-CONTROLLING A LOAD, the entire disclosure of which is hereby incorporated by reference.

The load control device 100 may comprise a two-wire zero-cross detect circuit 130 coupled across the first FET Q112 (e.g., between the hot terminal H and the dimmed hot terminal DH) for generating a two-wire zero-cross signal $V_{2WZC}$. The load control device 100 may also comprise a three-wire zero-cross detect circuit 140 (e.g., coupled between the hot terminal H and the neutral terminal N) for generating a three-wire zero-cross signal $V_{3WZC}$. The control circuit 115 may be configured to receive the two-wire zero-cross signal $V_{2WZC}$ and/or the three-wire zero-cross signal $V_{3WZC}$, and to determine the times of the zero-crossing points of the AC mains line voltage $V_{AC}$ in response to the two-wire zero-cross signal $V_{2WZC}$ and/or the three-wire zero-cross signal $V_{3WZC}$.

The load control device 100 may comprise a neutral wire detect circuit 150 coupled in series with the neutral terminal N (e.g., between the three-wire zero-cross detect circuit 140 and the neutral terminal N). The neutral wire detect circuit 140 may be configured to generate a neutral wire detect signal $V_{NWD}$ in response to current flowing through the three-wire zero-cross detect circuit 140. The control circuit 115 may be configured to detect if the neutral terminal N is connected to the neutral side of the AC power source 104 in response to the neutral wire detect circuit 150. The control circuit 115 may be configured to determine whether to operate in the two-wire mode or the three-wire mode in response to the neutral wire detect signal $V_{NWD}$. For example, the control circuit 115 may be configured to automatically determine to operate in the two-wire mode in response to detecting that the neutral terminal N is not connected to the neutral side of the AC power source 104 and to operate in the three-wire mode in response to detecting that the neutral terminal N is connected to the neutral side of the AC power source. For example, the control circuit 115 may be configured to automatically determine to operate in the two-wire mode or the three-wire mode in response to the neutral wire detect signal $V_{NWD}$ during a start-up procedure of the control circuit (e.g., when power is first applied to the load control device 100). In addition, the control circuit 115 may monitor the neutral wire detect signal $V_{NWD}$ during normal operation and determine to change between the two-wire mode and three-wire mode in response to the neutral wire detect signal $V_{NWD}$.

The control circuit 115 may be configured to provide a visual indication when the control circuit decides (e.g., automatically decides) to operate in the two-wire or three-wire mode in response to the neutral wire detect signal $V_{NWD}$ (e.g., to indicate when the neutral terminal N is connected to the neutral side of the AC power source 104). The control circuit 115 may blink one or more of the visual indicators of the user interface 122 when the control circuit decides to operate in the two-wire or the three-wire mode. For example, the control circuit 115 may control the user interface 122 to blink twice a top visual indicator of a vertically-oriented linear array of visual indicators when the control circuit decides to operate in the three-wire mode. The control circuit 115 may be configured to not provide a visual indication when the control circuit decides to operate in the two-wire mode. Since the control circuit 115 automatically decides to operate in the two-wire mode or the three-wire mode, the visual indication that the load control device 100 is operating in the two-wire mode or the three-wire mode may be useful in determining how the load control device is operating.

The control circuit 115 may also be configured to provide a visual indication of the mode (e.g., two-wire mode or three-wire mode) that the control circuit is operating in during the advanced programming mode (e.g., to indicate when the neutral terminal N is connected to the neutral side of the AC power source 104). The control circuit 115 may be configured to provide the visual indication of the mode when, for example, the control circuit is first entering the advanced programming mode. For example, the control circuit 115 may be configured to blink one of the visual indicators a first number of times to indicate the two-wire mode and second number of times to indicate the three-wire mode. In addition, the control circuit 115 may be configured to provide a visual indication of the phase-control dimming technique (e.g., the forward phase-control dimming technique or the reverse phase-control dimming technique) that is presently being used during the advanced programming mode. For example, the control circuit 115 may be configured to blink one of the visual indicators (e.g., a different visual indicator than used to indicate the mode) a first number of times to indicate the forward phase-control dimming technique and second number of times to indicate the reverse phase-control dimming technique.

The control circuit 115 may be configured to control the FETs Q112, Q114 using both the forward phase-control dimming technique and/or the reverse phase-control dimming technique. When using the forward phase-control dimming technique, the control circuit 115 may render one or both of the FETs Q112, Q114 non-conductive (e.g., to cause the controllably conductive device 110 to be non-conductive) at the beginning of each half-cycle of the AC mains line voltage, and then render one or both of the FETs Q112, Q114 conductive (e.g., to cause the controllably conductive device 110 to be conductive) at the firing time during the half-cycle after which the controllably conductive device 110 may remain conductive until the end of the half-cycle. When using the reverse phase-control dimming technique, the control circuit may render one or both of the FETs Q112, Q114 conductive (e.g., to cause the controllably conductive device 110 to be conductive) at the beginning of each half-cycle of the AC mains line voltage, and then render one or both of the FETs Q112, Q114 non-conductive (e.g., to cause the controllably conductive device 110 to be non-conductive) at the firing time during the half-cycle after which the controllably conductive device 110 may remain non-conductive until the end of the half-cycle.

The load control device 100 may comprise an impedance circuit 160, such as a resistive load circuit (e.g., a "dummy" load circuit), for discharging a capacitance of the lighting load 102, for example, after the control circuit 115 renders the FETs Q112, Q114 non-conductive at the firing time when using the reverse phase-control dimming technique. The impedance circuit 160 may be coupled between the dimmed-hot terminal DH and the neutral terminal N (e.g., in parallel with the lighting load 102). The impedance circuit may conduct a discharge current (e.g., through the dimmed-hot terminal DH, the neutral wire detect circuit 150, and the neutral terminal N) in order to discharge the capacitance of the lighting load 102 after the FETs are rendered non-conductive. For example, the impedance circuit 160 may be characterized by a resistance of approximately 68 kΩ.

The control circuit 115 may configured to determine the firing times for rendering the FETs Q112, Q114 conductive each half-cycle based on the times of zero-crossing points of the AC mains line voltage $V_{AC}$ as determined from the two-wire zero-cross detect circuit 130 and/or the three-wire zero-cross detect circuit 140. The two-wire zero-cross detect circuit 130 may comprise a simple zero-cross detect circuit and may drive the magnitude of the two-wire zero-cross signal $V_{2WZC}$ low towards circuit common when the magnitude of the voltage across the first FET Q112 exceeds a predetermined threshold.

The three-wire zero-cross detect circuit 140 may comprise a more advanced zero-cross detect circuit that includes a filter circuit 142 (e.g., a full-wave filter circuit) and/or a signal generation circuit 144. The filter circuit 142 may comprise a low-pass active filter circuit (e.g., comprising one or more operational amplifiers), such as a fourth-order Bessel filter. The filter circuit 142 may receive a signal that represents the AC mains line voltage $V_{AC}$, and may generate a filtered signal $V_F$. The filter circuit 142 may operate to substantially remove from (or attenuate in) the filtered signal $V_F$ frequency components of the AC mains line voltage $V_{AC}$ that are above the fundamental frequency. The signal generation circuit 144 may receive the filtered signal $V_F$ and generate the three-wire zero-cross signal $V_{3WZC}$. Examples of a zero-cross detect circuit having a filter circuit are described in greater detail in U.S. Pat. No. 6,091,205, issued Jul. 18, 2000, entitled PHASE CONTROLLED DIMMING SYSTEM WITH ACTIVE FILTER FOR PREVENTING FLICKERING AND UNDESIRED INTENSITY CHANGES, the entire disclosure of which is hereby incorporated by reference.

The filter circuit 142 and/or the signal generation circuit 144 may receive power from the DC supply voltage $V_{CC3}$ (e.g., which may be an isolated DC supply voltage), and may be referenced to a different reference point than the circuit common of the load control device 100 (e.g., the junction of the FETs Q112, Q114). The filter circuit 142 may be coupled between the hot terminal H and the neutral terminal N. The filter circuit 142 may be substantially the same as the circuit filter circuit shown in FIG. 8A of previously-referenced U.S. Pat. No. 6,091,205. The filter circuit 142 may also comprise an input circuit configured to scale and offset the AC mains line voltage $V_{AC}$ before being received by the operational amplifiers of the filter circuit. Since the filter circuit 142 receives a sinusoidal signal that is a scaled and offset version of the AC mains line voltage $V_{AC}$, the three-wire zero-cross detect circuit 140 may operate as a full-wave zero-cross detect circuit. With the filter circuit 142 configured in this manner, the filtered signal $V_F$ may be a sinusoidal signal (e.g., a full-wave sinusoidal signal) at the fundamental frequency of the AC mains lines voltage $V_{AC}$ (e.g., without high-frequency components). In examples (e.g., when the signal generation circuit 144 is not referenced to circuit common), the signal generation circuit 144 may comprise an optocoupler circuit at its output for coupling the three-wire zero-cross signal $V_{3WZC}$ to the control circuit 115.

Due to a delay introduced by the filter circuit 142, the filtered signal $V_F$ may be characterized by a phase delay with respect to the AC mains line voltage $V_{AC}$. Different filter circuits may produce different phase delays. For example, a full-wave filter circuit (e.g., the filter circuit 142 in FIG. 1) may produce a different phase delay than a half-wave filter circuit (e.g., the filter circuit 642 in FIG. 6). The signal generation circuit 144 may generate edges in the three-wire zero-cross signal $V_{3WZC}$ (e.g., drive the three-wire zero-cross signal $V_{3WZC}$ low towards circuit common) when the magnitude of the filtered voltage $V_F$ exceeds a predetermined threshold (e.g., the signal generation circuit 144 may be a simple zero-cross detect circuit). Because of the phase delay between the filtered signal $V_F$ and the AC mains line voltage $V_{AC}$, the edges of the three-wire zero-cross signal $V_{3WZC}$ that indicate the zero-crossing points of the AC mains line voltage $V_{AC}$ may be offset (e.g., delayed) from the actual zero-crossing points of the AC mains line voltage $V_{AC}$. The phase delay may be pre-determined. The control circuit 115 may be configured to store a value representing the phase delay in the memory 128 and process the three-wire zero-cross signal $V_{3WZC}$ by factoring in the phase delay to determine the actual times of the zero-crossing points of the AC mains line voltage $V_{AC}$.

When the load control device 100 is operating in the three-wire mode, the power supply 120 may be configured to conduct a charging current through the neutral terminal N, the diode D123, the body diode of the first FET Q112, and the hot terminal H during the negative half-cycles of the AC mains lines voltage $V_{AC}$. During the positive half-cycles, the power supply 120 may be configured to conduct the charging current through the hot terminal H, the diode D121, the body diode of the second FET Q114, the dimmed-hot terminal DH, and the lighting load 102. In some cases, it may be desirable to prevent the charging current of the power supply 120 from being conducted through the lighting load 102 during the three-wire mode. The load control device 100 may comprise a controllable switching circuit 129 (e.g., that may include a FET) coupled in series with the diode D121. The control circuit 115 may be configured to generate a switch signal $V_{SW}$ for rendering the controllable switching circuit 129 conductive and non-conductive. When the load control device is operating in the two-wire mode, the control circuit 115 may be configured to render the controllable switching circuit 129 conductive, such that the power supply 120 may conduct the charging current through the diode D121 during the positive half-cycles. When the load control device 100 is operating in the three-wire mode, the control circuit 115 may be configured to render the controllable switching circuit 129 non-conductive, such that the power supply 120 is not able to conduct the charging current through the diode D121 during the positive half-cycles. In the three-wire mode, the power supply 120 may only be able to conduct the charging current through the neutral terminal N in the negative half cycles (e.g., the power supply operates a half-wave power supply).

As described herein, the control circuit 115 may be configured to determine whether to operate in the two-wire mode or the three-wire mode in response to the neutral wire detect signal $V_{NWD}$ generated by the neutral wire detection circuit 150. As such, the control circuit 115 may control the switch signal $V_{SW}$ for rendering the controllable switching circuit 129 conductive and non-conductive based on the neutral wire detect signal $V_{NWD}$. Alternatively or additionally, the control circuit 115 may be configured to determine whether it is operating in the two-wire mode or the three-wire mode and to respectively render the controllable switching circuit 129 conductive and non-conductive based on a user input (e.g., which may be received from a user input device such as a button or a switch), based on a digital message received from an external device (e.g., from a system controller), and/or based on another suitable mechanism.

Figure 2:
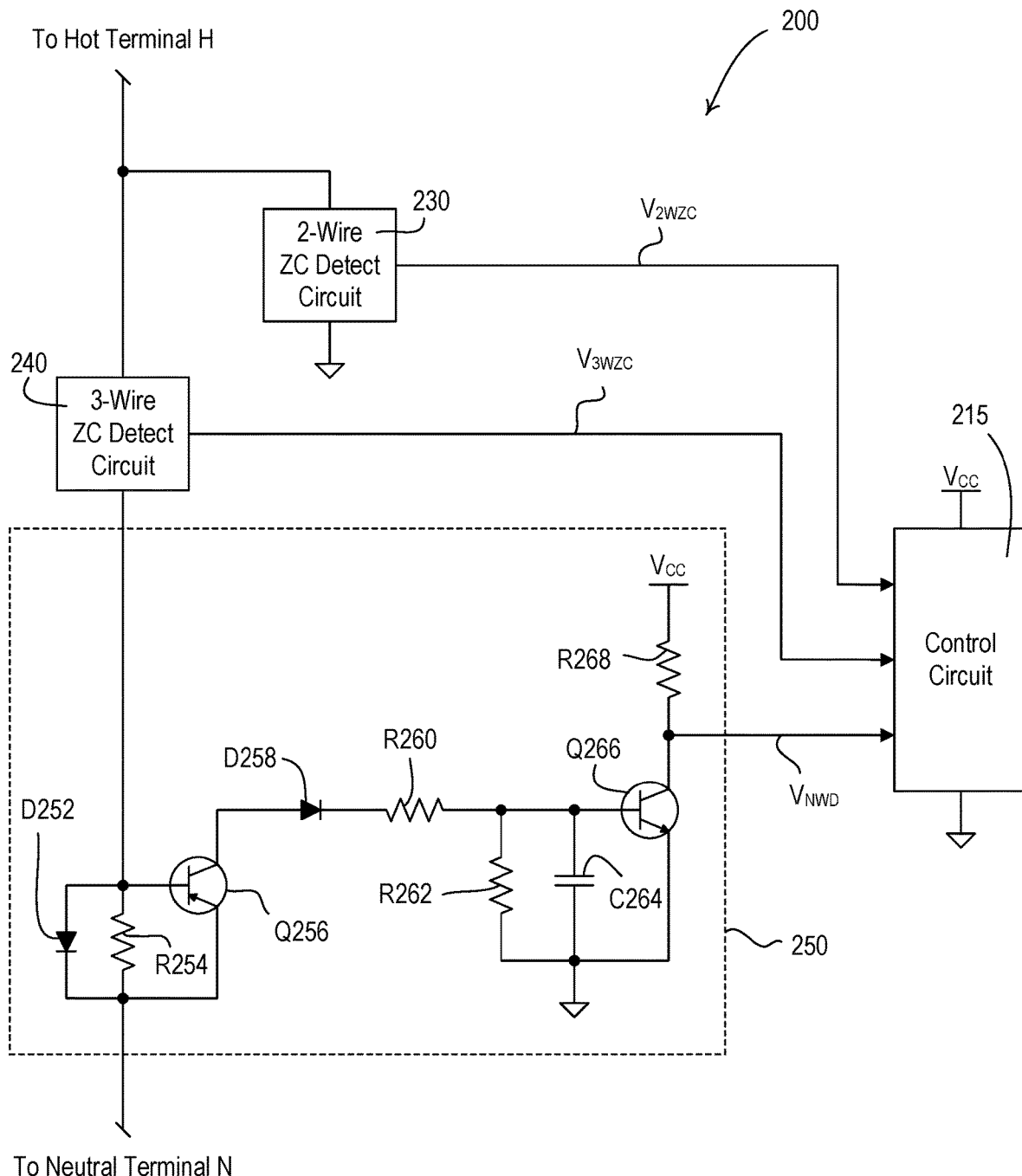
FIG. 2 is a simplified partial schematic diagram of another example load control device showing a neutral wire detect circuit.
Figure 3A:
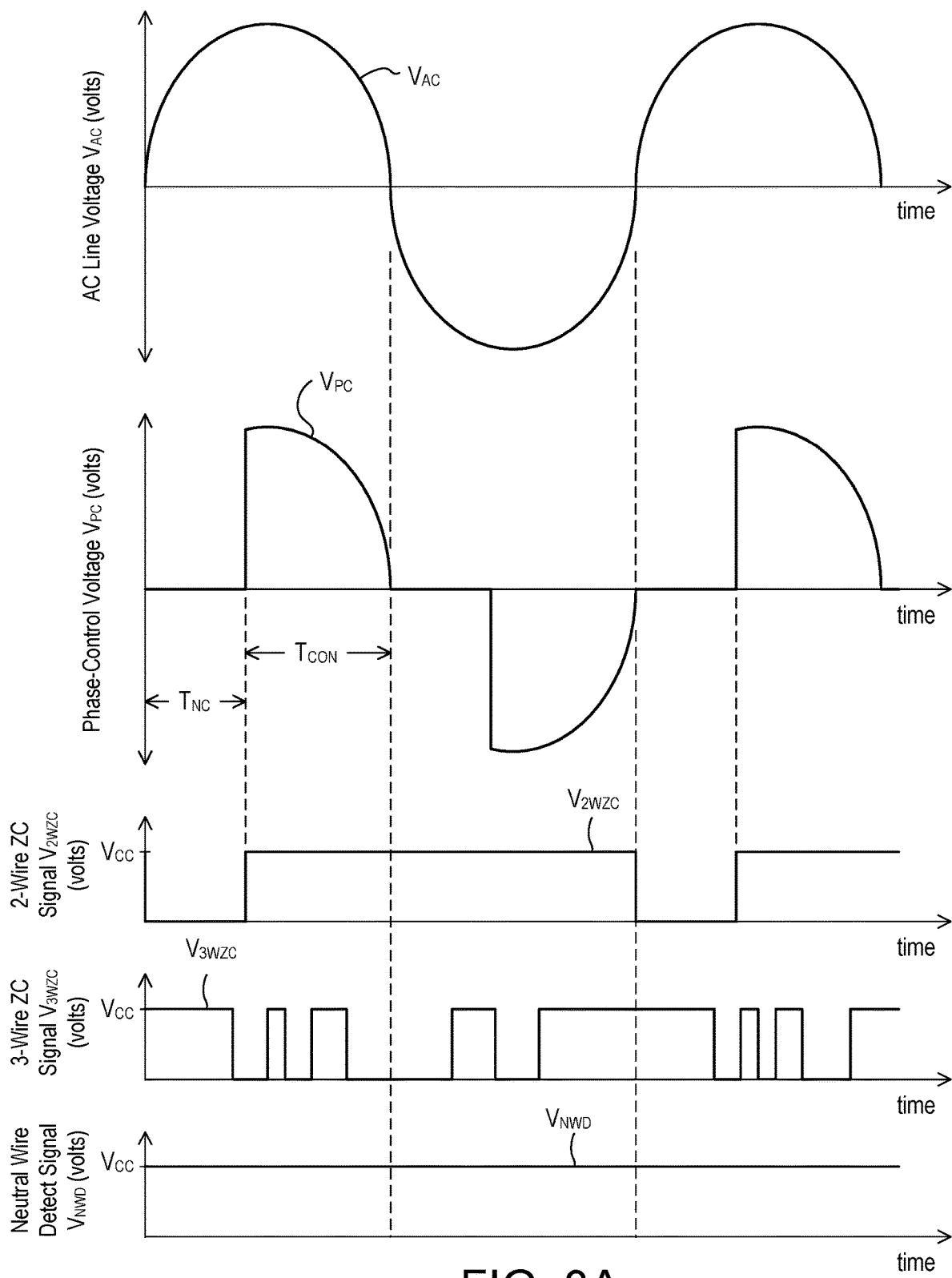
FIGS. 3A and 3B show simplified waveforms that illustrate the operation of the load control device of FIG. 2.
Figure 3B:
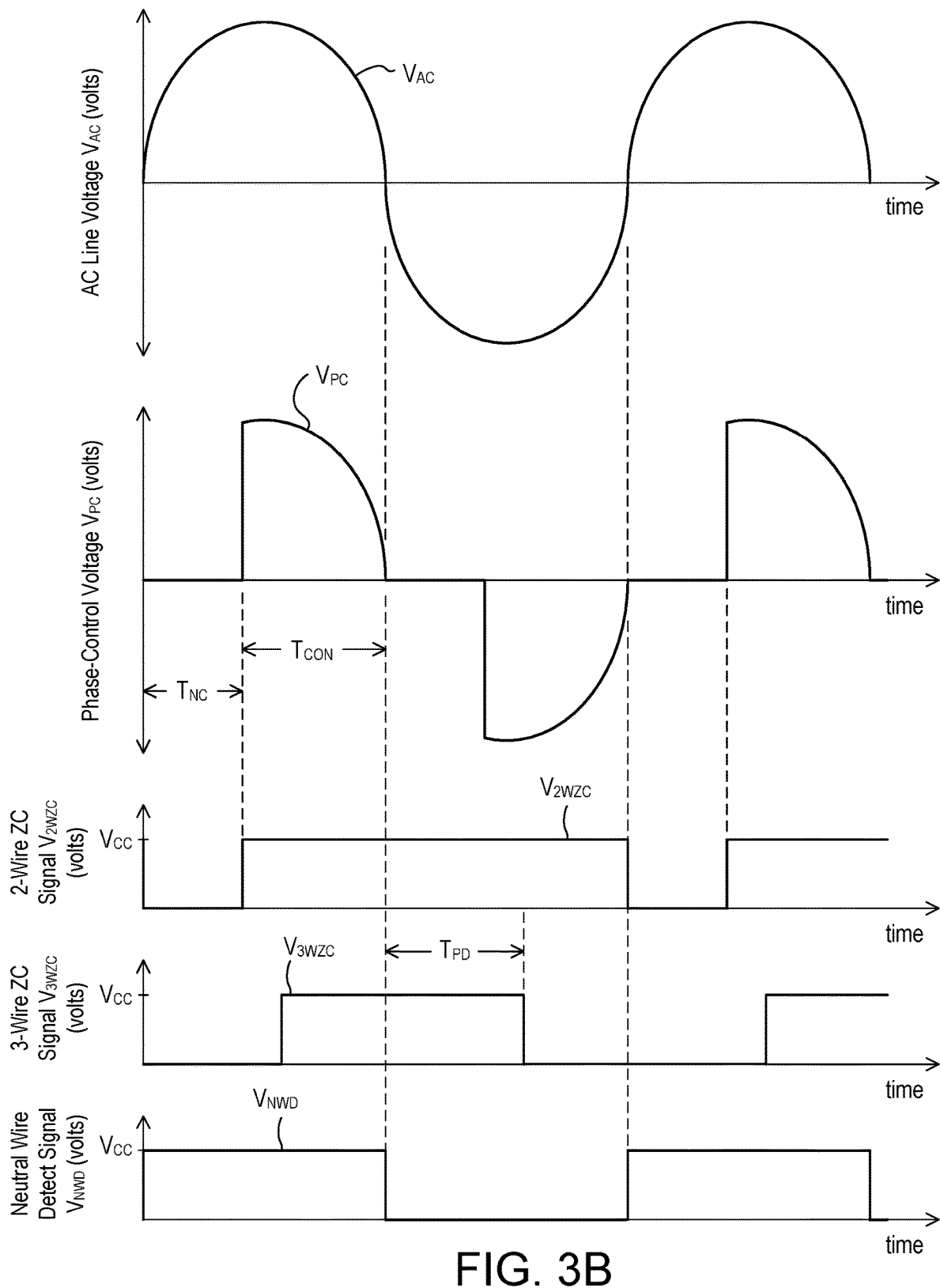

FIG. 2 is a simplified partial schematic diagram of another example load control device 200 (e.g., the load control device 100 shown in FIG. 1 or the load control device 600 shown in FIG. 6) for controlling the amount of power delivered to an electrical load, such as a lighting load (e.g., the lighting load 102). FIGS. 3A and 3B show simplified waveforms that illustrate the operation of the load control device 200. The load control device 200 may comprise a control circuit 215 (e.g., a digital control circuit) configured to control a controllably conductive device (not shown), such as, for example, the FETs Q112, Q114 of the load control device 100 shown in FIG. 1. The control circuit 215 may include one or more of a processor (e.g., a microprocessor), a microcontroller, a programmable logic device (PLD), a field programmable gate array (FPGA), an application specific integrated circuit (ASIC), or any suitable controller or processing device. The control circuit 215 may be configured to control the controllably conductive device using a forward phase-control dimming technique or a reverse phase-control technique to generate a phase-control voltage $V_{PC}$ across the lighting load. For example, as shown in FIGS. 3A and 3B, the control circuit may control the controllably conductive device using the forward phase-control dimming technique for controlling the magnitude of the phase-control voltage to be approximately equal to zero volts for a non-conduction time period $T_{NC}$ at the beginning of each half-cycle and approximately equal to the magnitude of the AC line voltage for a conduction time period $T_{CON}$ at the end of each half-cycle.

The load control device 200 may comprise a two-wire zero-cross detect circuit 230 that may be coupled across one or more of the FETs of the controllably conductive device. For example, the two-wire zero-cross detect circuit 230 may be coupled across a first one of the FETs (e.g., the first FET Q112 as shown in FIG. 1). The two-wire zero-cross detect circuit 230 may be responsive to the voltage developed across the first FET Q112 (e.g., when the first FET Q112 is non-conductive) and may generate a two-wire zero-cross signal $V_{2WZC}$ that may indicate zero-crossing points of the AC mains line voltage $V_{AC}$.

The load control device 200 may comprise a three-wire zero-cross detect circuit 240 that may be coupled between a hot terminal H and a neutral terminal N of the load control device 200. The three-wire zero-cross detect circuit 240 may be responsive to the AC mains line voltage $V_{AC}$ and may generate a three-wire zero-cross signal $V_{3WZC}$ that may indicate zero-crossing points of the AC mains line voltage $V_{AC}$. The three-wire zero-cross detect circuit 240 may comprise a filter circuit (not shown), such as a low-pass active filter circuit as described above with reference to FIG. 1.

The load control device 200 may also comprise a neutral wire detect circuit 250 coupled in series with the three-wire zero-cross detect circuit 240 between the hot terminal H and the neutral terminal N. The neutral wire detect circuit 250 may generate a neutral wire detect signal $V_{NWD}$ in response to current flowing through the three-wire zero-cross detect circuit 240 (e.g., the neutral wire detect circuit 250 may be a current-sensing device). The neutral wire detect signal $V_{NWD}$ may indicate when the neutral terminal N is connected to the neutral side of the AC power source. The neutral wire detect circuit 250 may comprise a diode D252 and a resistor R254 (e.g., having a resistance of approximately 4.74 kΩ) that may be coupled in parallel. The parallel combination of the diode D252 and the resistor R254 may be coupled across the base-emitter junction of a PNP bipolar junction transistor Q256. The transistor Q256 may be coupled to the base of an NPN bipolar junction transistor Q266 via a diode D258 and a resistor R260 (e.g., having a resistance of approximately 1 MΩ). The neutral wire detect circuit 250 may also comprise a resistor R262 (e.g., having a resistance of approximately 52.3 kΩ) and a capacitor C264 (e.g., having a capacitance of approximately 1000 pF) coupled in parallel across the base-emitter junction of the transistor Q266. The collector of the transistor Q266 may be coupled to the supply voltage $V_{CC}$ through a resistor R268. The neutral wire detect signal $V_{NWD}$ may be generated at the junction of the transistor Q266 and the resistor R268, and may be provided to the control circuit 215. In addition, the collector of the transistor Q266 may be coupled to the supply voltage $V_{CC}$ through an internal pull-up resistor of the control circuit 215.

During the positive half-cycles of the AC mains line voltage $V_{AC}$, the three-wire zero-cross detect circuit 240 may conduct current from the hot terminal H through the parallel combination of the diode D252 and the resistor R254 and out the neutral terminal N. At this time, the transistor Q256 may be non-conductive. During the negative half-cycles, the three-wire zero-cross detect circuit 240 may conduct current from the neutral terminal N through the resistor R254 and out through the hot terminal H. The resistor R254 may generate a voltage that exceeds the rated emitter-base voltage of the transistor Q256, thus causing the transistor Q256 to become conductive. When conductive, the transistor Q256 may conduct current through the diode D258 and the resistors R260, R262. The resistor R262 may generate a voltage that exceeds the rated base-emitter voltage of the transistor Q266, thus causing the transistor Q266 to become conductive. When the transistor Q266 is conductive, the transistor Q266 may drive the magnitude of the neutral wire detect signal $V_{NWD}$ down towards circuit common.

The control circuit 115 may be configured to determine whether to operate in the two-wire mode or the three-wire mode in response to the neutral wire detect signal $V_{NWD}$. FIG. 3A shows simplified waveforms that illustrate the operation of the load control device 200 when the load control device is operating in the two-wire mode. FIG. 3B shows simplified waveforms that illustrate the operation of the load control device 200 when the load control device is operating in the three-wire mode.

When the neutral terminal N is not connected to the neutral side of the AC power source (e.g., when the load control device 200 is configured to operate in the two-wire mode), the three-wire zero-cross detect circuit 240 may not conduct current through the neutral wire detect circuit 250. Thus, the transistor Q266 of the neutral wire detect circuit 250 may be non-conductive and the magnitude of the neutral wire detect signal $V_{NWD}$ may be pulled up towards the supply voltage $V_{CC}$ in both the positive and negative half-cycles of the AC mains line voltage $V_{AC}$ (e.g., as shown in FIG. 3A). The control circuit 215 may be configured to operate in the two-wire mode in response to detecting that the magnitude of the neutral wire detect signal $V_{NWD}$ may be pulled up towards the supply voltage $V_{CC}$ (e.g., approximately maintained at the supply voltage $V_{CC}$) in both the positive and negative half-cycles.

When operating in the two-wire mode, the control circuit 215 may control the FETs of the controllably conductive device in response to the two-wire zero-cross signal $V_{2WZC}$. The two-wire zero-cross detect circuit 230 may drive the magnitude of the two-wire zero-cross signal $V_{2WZC}$ low towards circuit common when the magnitude of the voltage across the first FET Q112 exceeds a predetermined threshold (e.g., during the non-conduction time period $T_{NC}$ as shown in FIG. 3A). The control circuit 215 may be configured to determine a zero-crossing point at the beginning of each line cycle of the AC mains line voltage $V_{AC}$ in response to detecting a falling edge of the two-wire zero-cross signal $V_{2WZC}$. When the neutral terminal N is not connected to the neutral side of the AC power source 104 (e.g., the neutral terminal N is floating), the voltages at the inputs of the operational amplifiers of the filter circuit 142 may be at unknown magnitudes and the signal generator 144 may generate edges in the three-wire zero-cross signal $V_{3WZC}$ at random times as shown in FIG. 3A (e.g., the edges of the three-wire zero-cross signal $V_{3WZC}$ may not always indicate zero-crossing points of the AC mains line voltage VAC when operating in the two-wire mode).

When the neutral terminal N is connected to the neutral side of the AC power source (e.g., when the load control device 200 is configured to operate in the three-wire mode), the three-wire zero-cross detect circuit 240 may conduct current through the neutral wire detect circuit 250. For example, during the positive half-cycles of the AC mains lines voltage $V_{AC}$, the transistor Q256 of the neutral wire detect circuit 250 may be non-conductive, and as a result, the transistor Q266 may be non-conductive causing the magnitude of the neutral wire detect signal $V_{NWD}$ to be pulled up towards the supply voltage $V_{CC}$. During the negative half-cycles, the transistors Q256, Q266 may both be rendered conductive causing the magnitude of the neutral wire detect signal $V_{NWD}$ to be pulled down towards circuit common (e.g., as shown in FIG. 3B). The control circuit 215 may be configured to operate in the three-wire mode in response to detecting changes in the magnitude of the neutral wire detect signal $V_{NWD}$ during one or more line cycles of the AC mains line voltage. For example, the control circuit 215 may be configured to operate in the three-wire mode in response to detecting a transition of the magnitude of the neutral wire detect signal $V_{NWD}$ between the supply voltage $V_{CC}$ and circuit common (e.g., in response to detecting that the magnitude of the neutral wire detect signal $V_{NWD}$ is pulled down towards circuit common in the negative half-cycles or that the magnitude of the neutral wire detect signal $V_{NWD}$ is pulled up towards the supply voltage $V_{CC}$ in the positive half-cycles). The control circuit 215 may count the number of such transitions during a preconfigured number of line cycles and determine whether the number of such transitions exceeds a threshold (e.g., a preconfigured threshold). The control circuit 215 may determine to operate in the three-wire mode if the number of such transitions reaches or exceeds the threshold, and operate in the two-wire mode if the number of such transitions is below the threshold.

When operating in the three-wire mode, the control circuit 215 may control the FETs of the controllably conductive device in response to the three-wire zero-cross signal $V_{3WZC}$. The three-wire zero-cross detect circuit 230 may generate edges in the three-wire zero-cross signal $V_{3WZC}$ that indicate the zero-crossing points of the AC mains line voltage $V_{AC}$. The frequency of the three-wire zero-cross signal $V_{3WZC}$ may be approximately equal to the frequency of the AC mains line voltage $V_{AC}$. The control circuit 215 may be configured to determine at least one zero-crossing point during each line cycle of the AC mains line voltage $V_{AC}$ in response to detecting edges of the three-wire zero-cross signal $V_{3WZC}$. Because of the phase delay between the filtered signal $V_F$ and the AC mains line voltage $V_{AC}$, the edges of the three-wire zero-cross signal $V_{3WZC}$ may be offset (e.g., delayed) from the actual zero-crossing points of the AC mains line voltage $V_{AC}$ by a phase delay period $T_{PD}$ (e.g., as shown in FIG. 3B). The phase delay period $T_{PD}$ may be predetermined, and the control circuit 215 may be configured to store a value representing the phase delay period $T_{PD}$ in memory. The control circuit 215 may be configured to determine the actual times of the zero-crossing points of the AC mains line voltage $V_{AC}$, for example, by subtracting the phase delay period from the times of the edges of the three-wire zero-cross signal $V_{3WZC}$.

Figure 4:
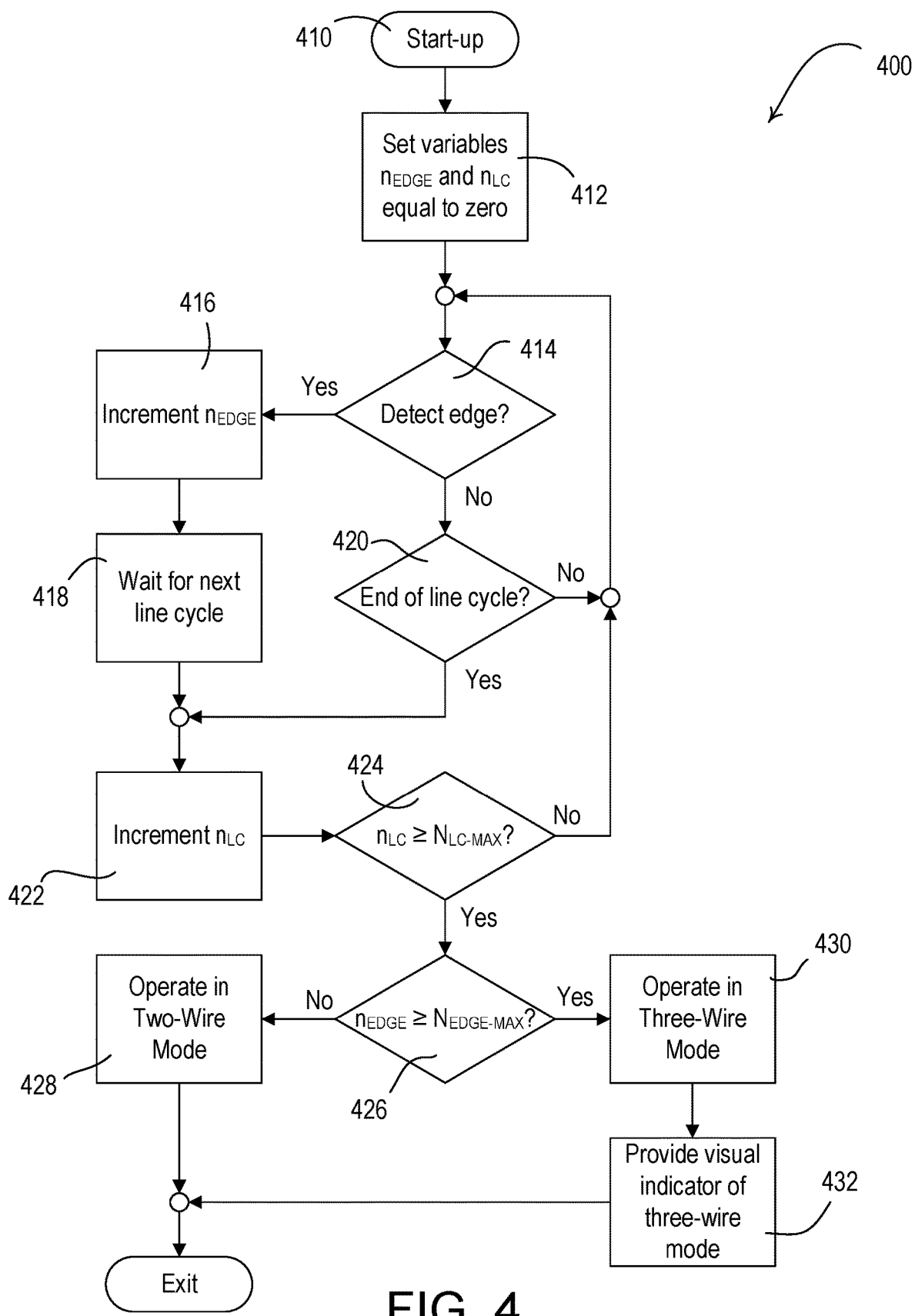
FIG. 4 shows a simplified flowchart of an example startup procedure that may be executed by a control circuit of a load control device.

FIG. 4 is a simplified flowchart of an example neutral wire detect procedure 400 that may be executed by a control circuit of a load control device (e.g., the control circuit 115 of the load control device 100, the control circuit 215 of the load control device 200, or the control circuit 615 of the load control device 600) during startup. Using such a procedure, the control circuit may automatically determine to operate in the two-wire mode or the three-wire mode in response to a neutral wire detection signal (e.g., the neutral wire detect signal $V_{NWD}$ described herein). For example, the control circuit may be configured to execute the procedure 400 during a start-up routine of the control circuit (e.g., when power is first applied to the load control device 100) so that the control circuit may determine (e.g., automatically determine) to operate in the two-wire mode or the three-wire mode in response to the neutral wire detect signal $V_{NWD}$.

Upon starting the procedure 400 at 410, the control circuit may initialize multiple variables at 412. For example, a variable $n_{EDGE}$ may be defined to represent the number of edges (or transitions) detected in the magnitude of the neutral wire detect signal $V_{NWD}$ during a number of line cycles of the AC mains line voltage $V_{AC}$, and the variable $n_{LC}$ may be defined to represent the number of line cycles of the AC mains line voltage. At 412, the control circuit may set the respective values of the variables $n_{EDGE}$ and $n_{LC}$ to zero. At 414, the control circuit may determine whether an edge has been detected in the neutral wire detect signal $V_{NWD}$ during a current line cycle of the AC mains line voltage $V_{AC}$. As described herein, such an edge may correspond to a transition of the magnitude of the neutral wire detect signal $V_{NWD}$ from a first value (e.g., a low value approximately equal to circuit common) to a second value (e.g., a high value approximately equal to the supply voltage $V_{CC}$), or vice versa. If the control circuit determines that an edge has been detected in the neutral wire detect signal $V_{NWD}$, the control circuit may increase the value of the variable $n_{EDGE}$ at 416, and may wait for the next line cycle at 418. The control circuit may also increment the value of the variable $n_{LC}$ to keep track of the number of line cycles during which edge monitoring has been performed.

At 424, the control circuit may compare the value of the variable $n_{LC}$ to a preconfigured maximum value $N_{LC-MAX}$ and determine whether the value of the variable $n_{LC}$ has reached or exceeded the preconfigured maximum value $N_{LC-MAX}$ (e.g., whether $n_{LC}$ is equal to or greater than $N_{LC-MAX}$). The preconfigured maximum value $N_{LC-MAX}$ may represent a maximum number of line cycles during which the control circuit should test (e.g., monitor) to determine whether to operate in the two-wire mode or the three-wire mode. The value of the preconfigured maximum value $N_{LC-MAX}$ (e.g., five line cycles) may be predetermined and stored in a memory of the load control device. If the control circuit determines that the value of the variable $n_{LC}$ has reached or exceeded the preconfigured maximum value $N_{LC-MAX}$, the control circuit may further determine, at 426, whether the value of the variable $n_{EDGE}$ has reached or exceeded another preconfigured maximum value $N_{EDGE-MAX}$ (e.g., whether $n_{EDGE}$ is equal to or greater than $N_{EDGE-MAX}$). The preconfigured maximum value $N_{EDGE-MAX}$ may represent a number of transitions or edges in the magnitude of the neutral wire detect signal $V_{NWD}$ that, if detected within the preconfigured maximum value $N_{LC-MAX}$ line cycles, should cause the control circuit to operate in the three-wire mode. The value of the maximum preconfigured value $N_{EDGE-MAX}$ (e.g., three edges) may be predetermined and stored in a memory of the load control device.

If the control circuit determines that the number of edges (e.g., three or more edges) of the neutral wire detect signal $V_{NWD}$ within the maximum number of line cycles (e.g., five line cycles) of the AC mains line voltage $V_{AC}$ has reached or exceeded the predetermined maximum value $N_{EDGE-MAX}$ (e.g., three) at 426, the control circuit may determine to operate in the three-wire mode at 430, and may provide a visual indication that the control circuit is operating in the three-wire mode at 432 (e.g., by blinking one or more visual indicators). If the control circuit detects less than the number of edges (e.g., two or less edges) of the neutral wire detect signal $V_{NWD}$ within the maximum number of line cycles (e.g., five line cycles) of the AC mains line voltage $V_{AC}$, the control circuit may determine to operate in the two-wire mode at 428. After either 428 or 432, the control circuit may exit the procedure 400.

If the control circuit detects no edge of the neutral wire detect signal $V_{NWD}$ at 414, or if the control circuit determines that an end of the current line cycle of the AC mains line voltage has not been reached at 420, or if the preconfigured value of $n_{LC-MAX}$ has not been reached at 424, the control circuit may return to 414 to repeat the steps described above.

Figure 5A:
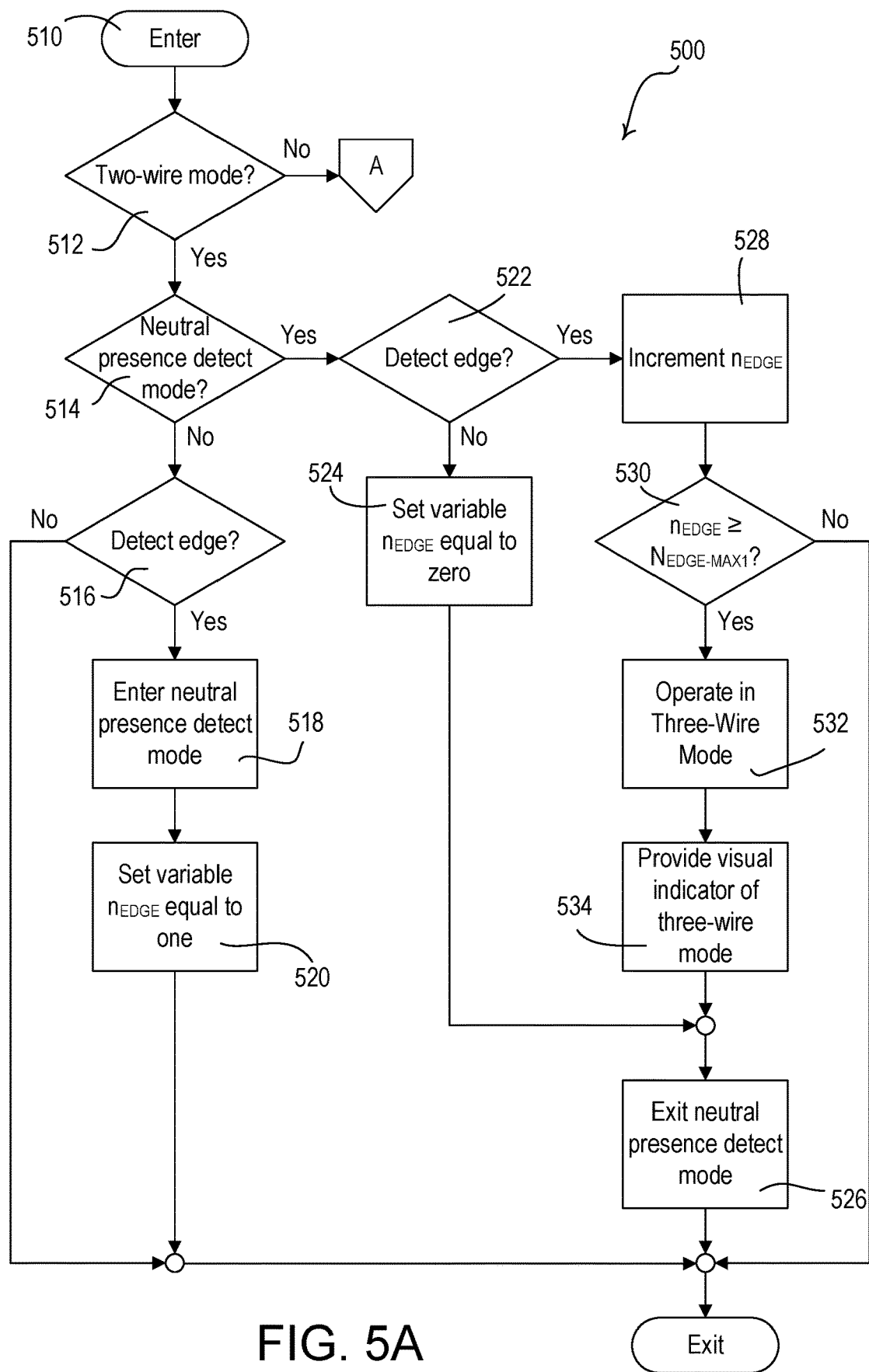
FIGS. 5A and 5B show a simplified flowchart of an example control procedure that may be executed by a control circuit of a load control device.
Figure 5B:
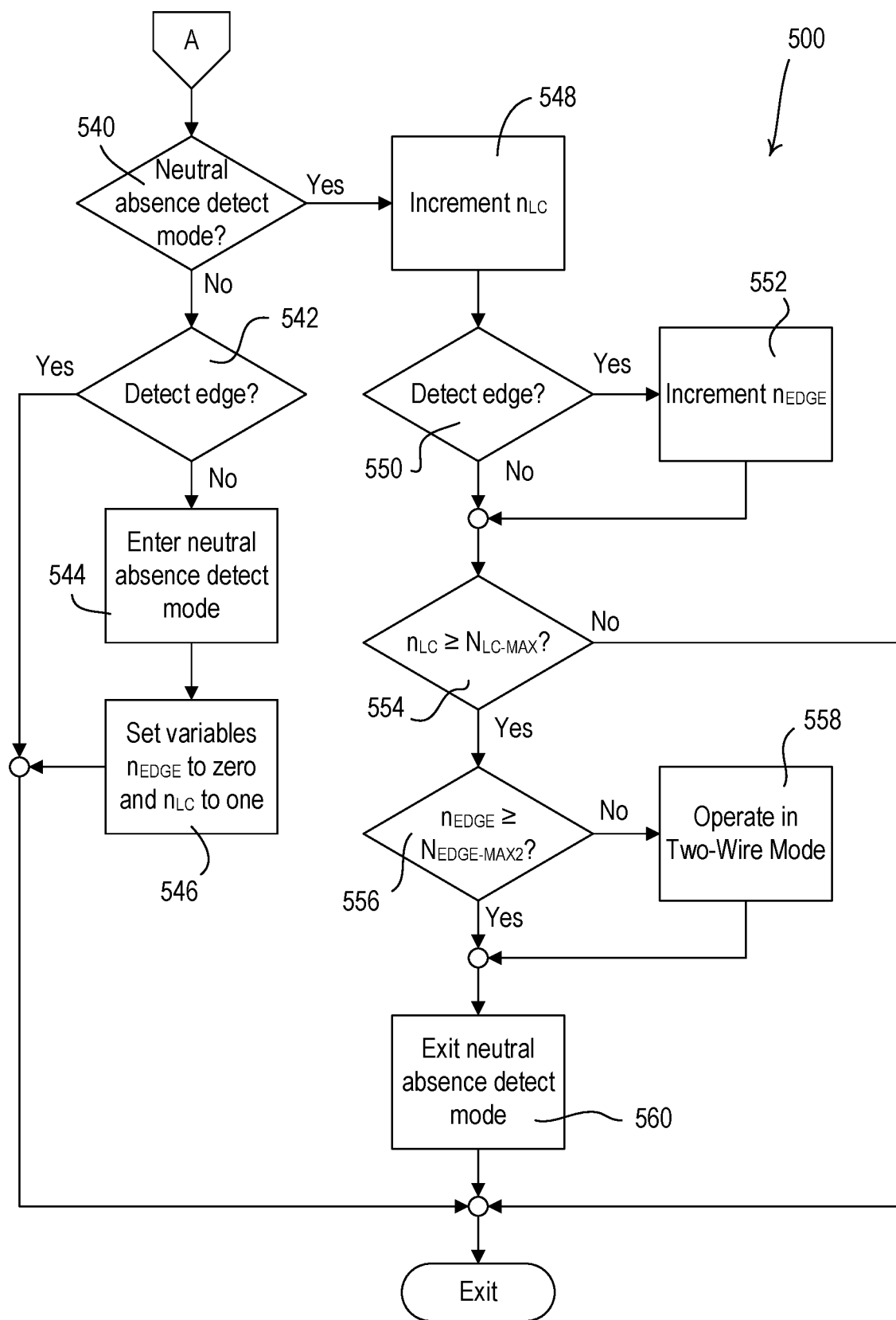

FIGS. 5A and 5B show a simplified flowchart of an example neutral wire detect procedure 500 that may be executed by a control circuit of a load control (e.g., the control circuit 115 of the load control device 100, the control circuit 215 of the load control device 200, or the control circuit 615 of the load control device 600). Using such a procedure, the control circuit may monitor the neutral wire detect signal $V_{NWD}$ during normal operation (e.g., without resetting the load control device to cause a start-up routine to be executed) so that the control circuit may determine to switch between the two-wire mode and three-wire mode in response to the neutral wire detect signal $V_{NWD}$. For example, when operating in the two-wire mode, the control circuit may determine to switch to the three-wire mode in response to detecting edges of the neutral wire detect signal $V_{NWD}$ (e.g., three or more edges within five line cycles). When operating in the three-wire mode, the control circuit may determine to switch to the two-wire mode in response to detecting a lack of edges of the neutral wire detect signal $V_{NWD}$ (e.g., no edges for at least five line cycles).

As shown in FIG. 5A, the control circuit may start the example neutral wire detect procedure 500 at 510. For example, the control circuit may execute the neutral wire detect procedure 500 periodically (e.g., every 1 second) at 1010. Multiple variables may be defined. For example, a variable $n_{EDGE}$ may be defined to represent the number of edges detected in the magnitude of the neutral wire detect signal $V_{NWD}$ during a number of line cycles of the AC mains line voltage, and a variable $n_{LC}$ may be defined to represent the number of such line cycles. At 512, the control circuit may determine whether the two-wire mode is being used. If the determination is that the two-wire mode is being used, the control circuit may further determine, at 514, whether the control circuit is operating in a neutral presence detect mode. If the control circuit is not operating in the neutral presence detect mode, the control circuit may determine whether an edge (e.g., a transition between a first magnitude and a second magnitude) of the neutral wire detect signal $V_{NWD}$ is detected at 516. If no edge is detected, the control circuit may exit the neutral wire detect procedure 500. If an edge is detected, the control circuit may enter the neutral presence detect mode at 518 (e.g., the control circuit may set a flag indicating that it is in the neutral presence detect mode), and may increment the value of the variable $n_{EDGE}$ (e.g., set the value of $n_{EDGE}$ to one) at 520 before exiting the neutral wire detect procedure 500.

If the control circuit determines at 514 that the control circuit is operating in the neutral presence detect mode (e.g., the control circuit may have previously set a flag indicating that the control circuit is in the neutral presence after detecting an edge of the neutral wire detect signal $V_{NWD}$ as described here), the control circuit may determine, at 522, whether an edge (e.g., a transition between a first magnitude and a second magnitude) of the neutral wire detect signal $V_{NWD}$ is detected. If no edge is detected, the control circuit may set the value of the variable $n_{EDGE}$ to zero at 524 and exit the neutral presence detect mode at 526 before exiting the neutral wire detect procedure 500. If an edge of the neutral wire detect signal $V_{NWD}$ is detected at 522, the control circuit may increment the value of the variable $n_{EDGE}$ at 528. At 530, the control circuit may compare the value of the variable $n_{EDGE}$ to a preconfigured maximum value $N_{EDGE-MAX1}$ and determine whether the value of the variable $n_{EDGE}$ has reached or exceeded the preconfigured maximum value $N_{EDGE-MAX1}$ (e.g., whether $n_{EDGE}$ is equal to or greater than $N_{EDGE-MAX1}$). The value of the preconfigured maximum value $N_{EDGE-MAX1}$ (e.g., three) may be predetermined and stored in a memory of the load control device.

If the control circuit determines at 530 that the variable $n_{EDGE}$ is equal to or greater than the preconfigured maximum value $N_{EDGE-MAX1}$, the control circuit may determine to operate in the three-wire mode at 532, provide a visual indication that the control circuit is operating in the three-wire mode at 534, and exit the neutral presence detect mode at 526, before the neutral wire detect procedure 500 exits. Alternatively, the control circuit may cause a reset of the load control device (e.g., cause a reset of the load control device at 532 instead of directly switching to the three-wire mode at 532). Such a reset may lead to initialization and execution of a startup routine during which a neutral wire detect procedure (e.g., the neutral wire detect procedure 400 shown in FIG. 4) may be executed by the control circuit to determine whether the load control device should operate in the two-wire mode or the three-wire mode.

If the control circuit determines at 512 that the control circuit is not operating in the two-wire mode (e.g., the three-wire mode is used), the control circuit may continue to 540 (shown in FIG. 5B) to determine whether the control circuit is operating in a neutral absence detect mode. If the control circuit is not in the neutral absence detect mode, the control circuit may determine at 542 whether an edge (e.g., a transition between a first magnitude and a second magnitude) of the neutral wire detect signal $V_{NWD}$ is detected. If an edge is detected, the control circuit may exit the neutral wire detect procedure 500. If the control circuit detects no edge of the neutral wire detect signal $V_{NWD}$, the control circuit may enter the neutral absence detect mode at 544, and may set the respective values of the variable $n_{EDGE}$ (e.g., set the value of $n_{EDGE}$ to zero) and the variable $n_{LC}$ (e.g., set the value of $n_{EDGE}$ to one) at 546 before exiting the neutral wire detect procedure 500.

If the control circuit determines at 540 that the control circuit is operating in the neutral absence detect mode, the control circuit may increment the value of the variable $n_{LC}$ (e.g., increment the value of $n_{LC}$ by one) at 548. At 550, the control circuit may determine whether an edge (e.g., a transition between a first magnitude and a second magnitude) of the neutral wire detect signal $V_{NWD}$ is detected. If no edge is detected, the control circuit may proceed to 554. If an edge of the neutral wire detect signal $V_{NWD}$ is detected, the control circuit may increment the value of the variable $n_{EDGE}$ (e.g., increment the value of $n_{EDGE}$ by one) at 552 before proceeding to 554. In either case, the control circuit may compare the value of the variable $n_{LC}$ to a preconfigured maximum value $N_{LC-MAX}$ at 554 to determine whether the value of the variable $n_{LC}$ has reached or exceeded the preconfigured maximum value $N_{LC-MAX}$ (e.g., whether $n_{LC}$ is equal to or greater than $N_{LC-MAX}$). The preconfigured maximum value $N_{LC-MAX}$ may represent a number of line cycles for the control circuit to test determine whether the control circuit should operate in the two-wire mode (e.g., or cause a reset of the load control device to determine whether to operate in the two-wire mode or the three-wire mode). The value of the preconfigured maximum value $N_{LC-MAX}$ (e.g., five line cycles) may be predetermined and stored in a memory of the load control device.

If the control circuit determines at 554 that the value of the preconfigured maximum value $N_{LC-MAX}$ has not been reached or exceeded, the control circuit may exit the neutral wire detect procedure 500. If the control circuit determines at 554 that the value of the preconfigured maximum value $N_{LC-MAX}$ has been reached or exceeded, the control circuit may further determine, at 556, whether the value of the variable $n_{EDGE}$ is equal to or greater than a preconfigured maximum value $N_{EDGE-MAX2}$ (e.g., whether $n_{EDGE}$ is equal to or greater than $N_{EDGE-MAX2}$). The value of the preconfigured maximum value $N_{EDGE-MAX2}$ (e.g., three) may be predetermined and stored in a memory of the load control device. The value of the preconfigured maximum value $N_{EDGE-MAX2}$ may be the same as or may be different from the value of the preconfigured maximum value $N_{EDGE-MAX1}$.

Figure 6:
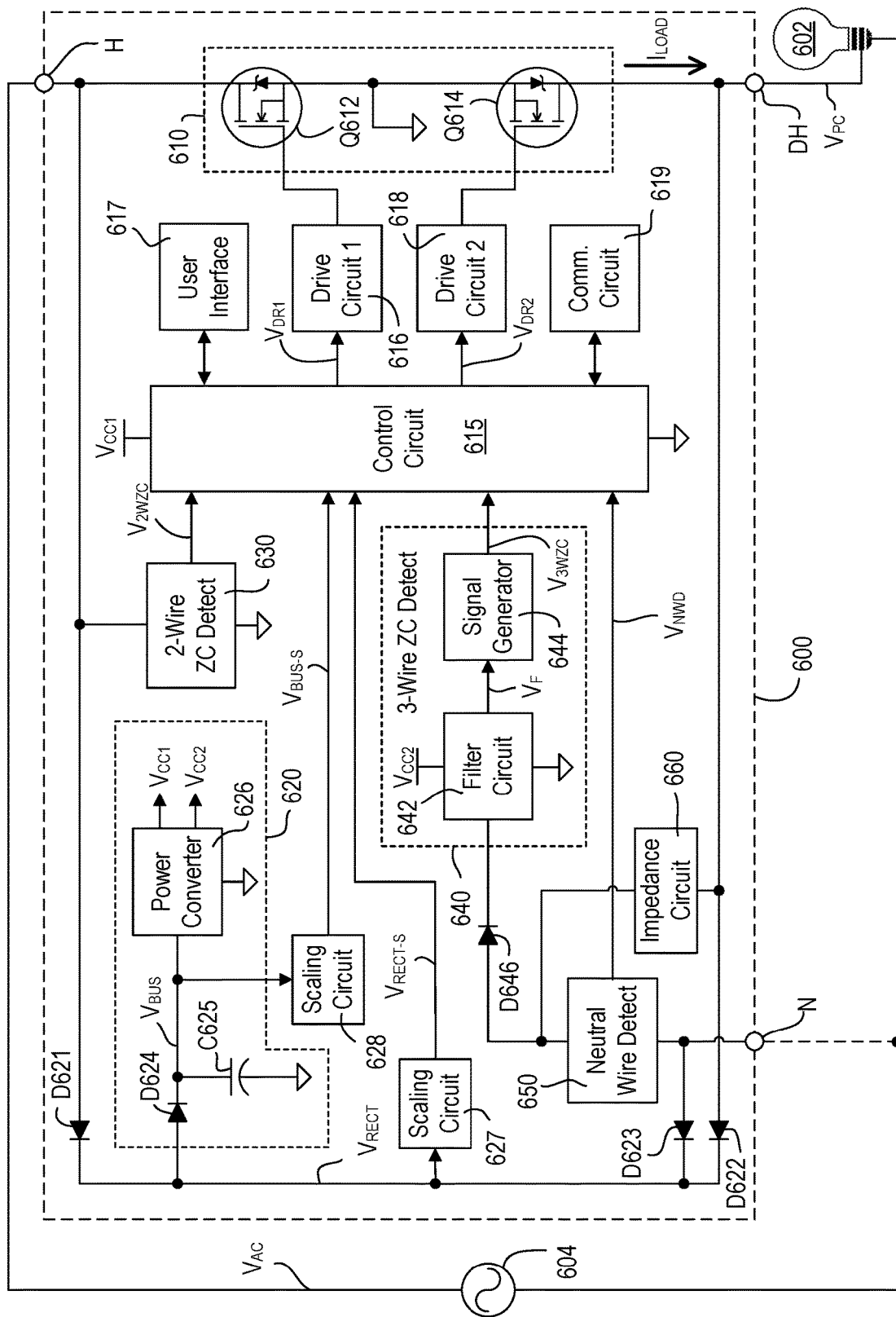
FIG. 6 is a simplified block diagram of an example load control device (e.g., a dimmer switch) for controlling the amount of power delivered to an electrical load, such as, a lighting load.

If the control circuit determines at 556 that the variable $n_{EDGE}$ is less than the preconfigured value of the preconfigured maximum value $N_{EDGE-MAX2}$, the control circuit may determine to operate in the two-wire mode at 558 and exit the neutral absence detect mode at 560, before the neutral wire detect procedure 500 exits. Alternatively, the control circuit may cause a reset of the load control device (e.g., cause a reset of the load control device at 558 instead of directly switching to the two-wire mode at 558). Such a reset may lead to the initialization and execution of a startup routine during which a neutral wire detect procedure (e.g., the neutral wire detect procedure 400) may be executed by the control circuit to determine whether the load control device should operate in the two-wire mode or the three-wire mode. If the control circuit determines at 556 that the variable $n_{EDGE}$ is equal to or greater than the preconfigured maximum value $N_{EDGE-MAX2}$, the control circuit may exit the neutral absence detect mode at 560, and the neutral wire detect procedure 500 may exit FIG. 6 is a simplified block diagram of an example load control device 600 (e.g., a dimmer switch) for controlling the amount of power delivered to an electrical load, such as, a lighting load 602. The load control device 600 may include a hot terminal H coupled to a hot side of an alternating-current (AC) power source 604 for receiving an AC mains line voltage $V_{AC}$, and a dimmed-hot terminal DH coupled to the lighting load 602. The load control device 600 may also include a neutral terminal N that may be adapted to be coupled (e.g., optionally coupled) to a neutral side of the AC power source 604. For example, the load control device 600 may be configured to operate in a two-wire mode when the neutral terminal N is not connected to the neutral side of the AC power source 604 and in a three-wire mode when the neutral terminal N is connected to the neutral side of the AC power source.

The load control device 600 may comprise a controllably conductive device 610 (e.g., such as the field-effect transistors (FETs) Q612, Q614) that may be coupled in anti-series connection between the hot terminal and the dimmed-hot terminal DH. The junction of the FETs may be coupled to circuit common. The load control device 600 may comprise a control circuit 615, e.g., a digital control circuit, for controlling the controllably conductive device 610 to conduct a load current $I_{LOAD}$ through the lighting load 602. The control circuit 615 may include one or more of a processor (e.g., a microprocessor), a microcontroller, a programmable logic device (PLD), a field programmable gate array (FPGA), an application specific integrated circuit (ASIC), or any suitable controller or processing device. The load control device 600 may comprise a memory (not shown) configured to store operational characteristics of the load control device. The memory may be implemented as an external integrated circuit (IC) or as an internal circuit of the control circuit 615.

The control circuit 615 may generate first and second drive signals $V_{DR1}$, $V_{DR2}$ that may be coupled to the gates of the respective FETs Q612, Q614 via first and second gate drive circuits 616, 618, respectively. When the controllably conductive device 610 is rendered conductive during the positive half-cycles of the AC power source 604, the load current $I_{LOAD}$ may be conducted through the drain-source channel of the first FET Q612 and the body diode of the second FET Q614. When the controllably conductive device 610 is rendered conductive during the negative half-cycles of the AC power source 604, the load current $I_{LOAD}$ may be conducted through the drain-source channel of the second FET Q614 and the body diode of the first FET Q612.

The load control device 600 may comprise a user interface 617, which may comprise, for example, one or more actuators (e.g., buttons) for receiving user inputs and/or one or more visual indicators for providing user feedback. For example, the user interface 617 may comprise a toggle actuator and an intensity adjustment actuator (e.g., such as a slider control or a pair of raise and lower buttons) for controlling the lighting load 602. The control circuit 615 may be configured to control the controllably conductive device 610 to control the amount of power delivered to the lighting load 602 in response to actuations of the actuators of the user interface 617. For example, the control circuit 615 may be configured to turn the lighting load 602 on and off in response to actuations of the toggle actuator. The control circuit 615 may also be configured to control the amount of power delivered to the lighting load 602 to adjust a desired intensity $L_{DES}$ of the lighting load between a high-end intensity $L_{HE}$ (e.g., 90-100%) and a low-end intensity $L_{LE}$ (e.g., 0.1-10%) in response to actuations of the intensity adjustment actuator. In addition, the user interface 617 may also comprise one or more light-emitting diodes (LEDs) for illuminating the visual indicators, for example, to provide a visual indication of a status and/or a present intensity of a lighting load, and/or a visual indication of a selected preset. For example, the user interface 617 may comprise a vertically-oriented linear array of visual indicators. The control circuit 615 may be coupled to the LEDs for illuminating the visual indicators of the user interface 617 to provide feedback.

The load control device 600 may comprise a communication circuit 619. The communication circuit 619 may comprise a wireless communication circuit, such as, for example, a radio-frequency (RF) transceiver coupled to an antenna for transmitting and/or receiving RF signals, an RF transmitter for transmitting RF signals, an RF receiver for receiving RF signals, or an infrared (IR) transmitter and/or receiver for transmitting and/or receiving IR signals. The communication circuit 619 may comprise a wired communication circuit configured to be coupled to a wired control link, for example, a digital communication link and/or an analog control link, such as a 0-10V control link or a pulse-width modulated (PWM) control link. In addition, the communication circuit 118 may be coupled to the electrical wiring connected to the load control device 600 for transmitting a control signal via the electrical wiring using, for example, a power-line carrier (PLC) communication technique. The control circuit 615 may be configured to turn the lighting load 602 on and off, and adjust the desired intensity $L_{DES}$ of the lighting load in response to messages (e.g., digital messages) received via the communication circuit 619.

The load control device 600 may include a power supply 620. The power supply 620 may generate a first direct-current (DC) supply voltage $V_{CC1}$ (e.g., 3.3V), e.g., for powering the control circuit 615 and/or the other low-voltage circuitry of the load control device 600. The power supply 620 may generate a second direct-current (DC) supply voltage $V_{CC2}$ (e.g., 12V), e.g., for powering the drive circuits 616, 618 to drive the FETs Q612, Q614. The load control device 600 may comprise a first diode D621 coupled between the hot terminal H and an input of the power supply 620, a second diode D622 coupled between the dimmed-hot terminal DH and the input of the power supply 620, and a third diode D623 coupled between the neutral terminal N and the input of the power supply 620. When the neutral terminal N is not connected to the neutral side of the power supply 620, the power supply 620 may be coupled to the AC power source 604 through a full-wave rectifier bridge that includes the first and second diodes D621, D622, and the body diodes of the FETs Q612, Q614. When the neutral terminal N is connected to the neutral side of the power supply 620, the power supply 620 may be coupled to the AC power source 604 through a full-wave rectifier bridge that includes the first and third diodes D621, D623, and the body diodes of the FETs Q612, Q614. The full-wave rectifier bridges (e.g., including the first diode D621, the second diode D622, the third diode D623, and/or the body diodes of the FETs Q612, Q614) may be configured to receive a voltage developed across the controllably conductive device 610 and generate a rectified voltage $V_{RECT}$ at the input of the power supply.

The power supply 620 may comprise a diode D624 configured to charge a bus capacitor C625 from the rectified voltage $V_{RECT}$. The power supply 620 may comprise a power converter circuit 626 (e.g., a flyback converter) configured to receive the bus voltage $V_{BUS}$ and generate the first and second DC supply voltages $V_{CC1}$, $V_{CC2}$. In addition, the power converter circuit 626 may comprise a linear regulator, a boost converter, a buck converter, a buck-boost converter, a single-ended primary-inductance converter (SEPIC), a ćuk converter, or any other suitable power converter circuit for generating the first and second DC supply voltages $V_{CC1}$, $V_{CC2}$.

The control circuit 615 may be configured to monitor one or more voltages of the power supply 610. The load control device may comprise a first scaling circuit 627 that may generate a scaled rectified voltage signal $V_{RECT-S}$ from the rectified voltage $V_{RECT}$ and/or a second scaling circuit 628 that may generate a scaled bus voltage signal $V_{BUS-S}$ from the bus voltage $V_{BUS}$. For example, the first and second scaling circuits 627, 628 may each comprise a resistive divider circuit. The control circuit 615 may be configured to sample the scaled rectified voltage signal $V_{RECT-S}$ and/or the scaled bus voltage signal $V_{BUS-S}$, for example, using internal analog-to-digital converters (ADCs), in order to determine the magnitude of the rectified voltage $V_{RECT}$ and the bus voltage $V_{BUS}$, respectively. The control circuit 615 may be configured to monitor the magnitude of the rectified voltage $V_{RECT}$ and/or the magnitude of the bus voltage $V_{BUS}$ to make sure that the power supply 620 is operating correctly and/or is able to operate correctly (e.g., as will be described in greater detail below). Since the bus voltage $V_{BUS}$ is generated across the capacitor C625, the magnitude of the bus voltage may change at a slower rate than the magnitude of the rectified voltage $V_{RECT}$ in certain conditions (e.g., when the magnitude of the rectified voltage may be decreasing rapidly indicating that the power supply is approaching a condition in which the power supply 620 may not be able to appropriately generate the first and second supply voltages $V_{CC1}$, $V_{CC2}$). The control circuit 615 may be configured to respond to such conditions more quickly using the scaled rectified voltage signal $V_{RECT-S}$ than the scaled bus voltage signal $V_{BUS-S}$. The scaled bus voltage signal $V_{BUS-S}$ may indicate continued conditions in which the power supply 620 may not be able to appropriately generate the first and second supply voltages $V_{CC1}$, $V_{CC2}$. The control circuit 615 may be configured to adjust how the controllably conductive device 610 is being controlled to try to avoid conditions in which the power supply 6520 may not be able to appropriately generate the first and second supply voltages $V_{CC1}$, $V_{CC2}$ (e.g., as will be described in greater detail below).

The control circuit 615 may be configured to determine times of zero-crossing points of the AC mains line voltage $V_{AC}$ of the AC power source 604. The control circuit 615 may then render the FETs Q612, Q614 conductive and/or non-conductive at predetermined times (e.g., at a firing time or firing angle) relative to the zero-crossing points of the AC mains line voltage $V_{AC}$ to generate a phase-control voltage $V_{PC}$ using a phase-control dimming technique (e.g., a forward phase-control dimming technique and/or a reverse phase-control dimming technique). The control circuit 615 may be configured to adjust a phase angle (e.g., a conduction time) of the controllably conductive device 610 each half-cycle to control the amount of power delivered to the lighting load 602 and the intensity of the lighting load. For example, the control circuit 615 may be configured to adjust a present phase angle $\theta_{PRES}$ of the controllably conductive device 610 to adjust the intensity of the lighting load 602 to the desired intensity $L_{DES}$ (e.g., as set by the intensity adjustment actuator of the user interface 617). Using the forward phase-control dimming technique, the control circuit 615 may render the controllably conductive device 610 non-conductive at the beginning of each half cycle, and render the controllably conductive device conductive at a firing time (e.g., as determined from the present phase angle $\theta_{PRES}$) during the half cycle. Using the reverse phase-control dimming technique, the control circuit 615 may render the controllably conductive device 610 conductive at the beginning of each half cycle, and render the controllably conductive device non-conductive at a firing time (e.g., as determined from the present phase angle $\theta_{PRES}$) during the half cycle, after which the control circuit may maintain the controllably conductive device non-conductive for the rest of the half cycle.

The load control device 600 may comprise a two-wire zero-cross detect circuit 630 coupled across the first FET Q612 (e.g., between the hot terminal H and the dimmed hot terminal DH) for generating a two-wire zero-cross signal $V_{2WZC}$. The load control device 600 may also comprise a three-wire zero-cross detect circuit 640 coupled between the hot terminal H and the neutral terminal N for generating a three-wire zero-cross signal $V_{3WZC}$. The control circuit 615 may be configured to receive the two-wire zero-cross signal $V_{2WZC}$ and/or the three-wire zero-cross signal $V_{3WZC}$ and to determine the times of the zero-crossing points of the AC mains line voltage $V_{AC}$ in response to the two-wire zero-cross signal $V_{2WZC}$ and/or the three-wire zero-cross signal $V_{3WZC}$. For example, the control circuit 615 may use the forward phase-control dimming technique to control inductive loads, and may use the reverse phase-control dimming technique to control capacitive loads.

The load control device 600 may be programmed by a user during installation to use the forward phase-control dimming technique or the reverse phase-control dimming technique during operation. For example, the user may set the phase-control dimming technique using an advanced programming mode. The control circuit 615 may be configured to enter the advanced programming mode in response to one or more actuations of the actuators of the user interface 617. The control circuit 615 may employ a load detection process for determining a load type of lighting load 602 and use the phase-control dimming technique that is best suited for that load type. For example, the control circuit 615 may detect that the lighting load 602 is inductive, and may determine to use the forward phase-control dimming technique. For example, upon initial power up, the control circuit 615 may begin using the reverse phase-control dimming technique and may monitor the voltage across the lighting load 602 using a voltage monitor circuit (not shown) during the load detection process. In the event that the control circuit 615 detects an overvoltage condition (e.g., a voltage spike or ring-up condition) across the lighting load 602, the load control device may determine that the lighting load has inductive characteristics, and may begin using the forward phase-control dimming technique. Otherwise, the control circuit 615 may continue to use the reverse-phase control dimming technique. Similarly, upon initial power up, the control circuit 615 may begin using the forward phase-control dimming technique and may subsequently decide to switch to the reverse-phase control dimming technique (e.g., upon detecting that the lighting load has capacitive characteristics) or to continue to use the forward phase-control dimming technique.

The load control device 600 may comprise a neutral wire detect circuit 650 coupled in series with the neutral terminal N (e.g., between the three-wire zero-cross detect circuit 640 and the neutral terminal N). The neutral wire detect circuit 650 may be configured to generate a neutral wire detect signal $V_{NWD}$ in response to current flowing through the three-wire zero-cross detect circuit 640. The control circuit 615 may be configured to detect if the neutral terminal N is connected to the neutral side of the AC power source 604 in response to the neutral wire detect circuit 650. The control circuit 615 may be configured to determine whether to operate in the two-wire mode or the three-wire mode in response to the neutral wire detect signal $V_{NWD}$. For example, the control circuit 615 may be configured to automatically determine to operate in the two-wire mode in response to detecting that the neutral terminal N is not connected to the neutral side of the AC power source 604 and to operate in the three-wire mode in response to detecting that the neutral terminal N is connected to the neutral side of the AC power source. For example, the control circuit 615 may be configured to automatically determine to operate in the two-wire mode or the three-wire mode in response to the neutral wire detect signal $V_{NWD}$ during a start-up procedure of the control circuit (e.g., when power is first applied to the load control device 600). In addition, the control circuit 615 may monitor the neutral wire detect signal $V_{NWD}$ during normal operation and determine to switch between the two-wire mode and three-wire mode in response to the neutral wire detect signal $V_{NWD}$.

The control circuit 615 may be configured to provide a visual indication when the control circuit decides (e.g., automatically decides) to operate in the two-wire mode or the three-wire mode in response to the neutral wire detect signal $V_{NWD}$ (e.g., to indicate when the neutral terminal N is connected to the neutral side of the AC power source 604). The control circuit 615 may blink one or more of the visual indicators of the user interface 622 when the control circuit decides to operate in the two-wire mode or the three-wire mode. For example, the control circuit 615 may control the user interface 622 to blink twice a top visual indicator of a vertically-oriented linear array of visual indicators when the control circuit decides to operate in the three-wire mode. The control circuit 615 may be configured to not provide a visual indication when the control circuit decides to operate in the two-wire mode. Since the control circuit 615 automatically decides to operate in the two-wire mode or the three-wire mode, the visual indication that the load control device 600 is operating in the three-wire mode may be useful in determining how the load control device is operating.

The control circuit 615 may also be configured to provide a visual indication of the mode (e.g., two-wire mode or three-wire mode) that the control circuit is operating in during the advanced programming mode (e.g., to indicate when the neutral terminal N is connected to the neutral side of the AC power source 604). The control circuit 615 may be configured to provide the visual indication of the mode when, for example, the control circuit is first entering the advanced programming mode. For example, the control circuit 615 may be configured to blink one of the visual indicators a first number of times to indicate the two-wire mode and second number of times to indicate the three-wire mode. In addition, the control circuit 615 may be configured to provide a visual indication of the phase-control dimming technique (e.g., the forward phase-control dimming technique or the reverse phase-control dimming technique) that is presently being used during the advanced programming mode. For example, the control circuit 615 may be configured to blink one of the visual indicators (e.g., a different visual indicator than used to indicate the mode) a first number of times to indicate the forward phase-control dimming technique and second number of times to indicate the reverse phase-control dimming technique.

The control circuit 615 may be configured to control the FETs Q612, Q614 using the forward phase-control dimming technique and/or the reverse phase-control dimming technique. When using the forward phase-control dimming technique, the control circuit 615 may render one or both of the FETs Q612, Q614 non-conductive (e.g., to cause the controllably conductive device 610 to be non-conductive) at the beginning of each half-cycle of the AC mains line voltage, and then render one or both of the FETs Q612, Q614 conductive (e.g., to cause the controllably conductive device 610 to be conductive) at the firing time during the half-cycle after which the controllably conductive device 610 may remain conductive until the end of the half-cycle. When using the reverse phase-control dimming technique, the control circuit may render one or both of the FETs Q612, Q614 conductive (e.g., to cause the controllably conductive device 610 to be conductive) at the beginning of each half-cycle of the AC mains line voltage, and then render one or both of the FETs Q612, Q614 non-conductive (e.g., to cause the controllably conductive device 610 to be non-conductive) at the firing time during the half-cycle after which the controllably conductive device 610 may remain non-conductive until the end of the half-cycle.

The load control device 600 may comprise an impedance circuit 660, such as a resistive load circuit (e.g., a "dummy" load circuit), for discharging a capacitance of the lighting load 602, for example, after the control circuit 615 renders the FETs Q612, Q614 non-conductive at the firing time when using the reverse phase-control dimming technique. The impedance circuit 660 may be coupled between the dimmed-hot terminal DH and the neutral terminal N (e.g., in parallel with the lighting load 602). The impedance circuit may conduct a discharge current (e.g., through the dimmed-hot terminal DH, the neutral wire detect circuit 650, and the neutral terminal N) in order to discharge the capacitance of the lighting load 602 after the FETs are rendered non-conductive. For example, the impedance circuit 660 may be characterized by a resistance of approximately 68 kΩ.

The control circuit 615 may configured to determine the firing times for rendering the FETs Q612, Q614 conductive each half-cycle based on the times of zero-crossings points of the AC mains line voltage $V_{AC}$ as determined from the two-wire zero-cross detect circuit 630 and/or the three-wire zero-cross detect circuit 640. The two-wire zero-cross detect circuit 630 may comprise a simple zero-cross detect circuit and may drive the magnitude of the two-wire zero-cross signal $V_{2WZC}$ low towards circuit common when the magnitude of the voltage across the first FET Q612 exceeds a predetermined threshold.

The three-wire zero-cross detect circuit 640 may include a filter circuit 642 (e.g., a half-wave filter circuit) and/or a signal generation circuit 644. The filter circuit 642 may comprise a low-pass active filter circuit (e.g., comprising one or more operational amplifiers), such as a fourth-order Bessel filter. The filter circuit 642 and/or the signal generation circuit 644 may be referenced (e.g., directly referenced) to circuit common of the load control device 600 (e.g., circuit common at the junction of the FETs Q612, Q614). The filter circuit 642 may be powered by the second supply voltage $V_{CC2}$ (e.g., 12V) generated by the power supply 626. Accordingly, the power supply 620 may not need to generate another supply voltage (e.g., the isolated DC supply voltage $V_{CC3}$ described in association with FIG. 1) to power the filter circuit 642 and/or the signal generation circuit 644 (e.g., the power supply 626 may have a simpler design than the power supply 120 of the load control device 100 of FIG. 1). The input of the filter circuit 642 may be coupled to the neutral terminal N via a diode D646, which may cause the filter circuit to conduct current in the negative half-cycles of the AC mains line voltage $V_{AC}$ (e.g., conduct current only in the negative half-cycles such that the three-wire zero-cross detect circuit 640 operates as a half-wave zero-cross detect circuit). For example, the filter circuit 642 may conduct current during the negative half-cycles of the AC mains line voltage $V_{AC}$ through the neutral terminal N, the diode D646, circuit common, the body diode of the FET Q612, and the hot terminal H. During the positive half-cycles of the AC mains line voltage $V_{AC}$, the filter circuit 642 may not conduct current through the neutral terminal N, the diode D646, circuit common, the body diode of the FET Q612, or the hot terminal H.

The filter circuit 642 may receive a signal that represents the AC mains line voltage $V_{AC}$, and may generate a filtered signal $V_F$. The filter circuit 642 may operate to substantially remove from (or attenuate in) the filtered signal $V_F$ frequency components of the AC mains line voltage $V_{AC}$ that are above the fundamental frequency. The filter circuit 642 may be substantially the same as the circuit shown in FIG. 8A of previously-referenced U.S. Pat. No. 6,091,205. When the filter circuit receives a half-wave rectified signal through the diode D646, the filter circuit may not require an input circuit to scale and offset the AC mains line voltage $V_{AC}$ (e.g., as in the filter circuit 142 of the load control device 100 of FIG. 1). The signal generation circuit 644 (e.g., shown as a signal generator in FIG. 6) may receive the filtered signal $V_F$ and generate the three-wire zero-cross signal $V_{3WZC}$. When the signal generation circuit 644 is coupled to the circuit common of the load control device 600, the signal generation circuit may not require an optocoupler circuit at its output for coupling the three-wire zero-cross signal $V_{3WZC}$ to the control circuit 615.

The frequency of the three-wire zero-cross signal $V_{3WZC}$ may be approximately equal to the frequency of the AC mains line voltage $V_{AC}$. The control circuit 615 may be configured to determine at least one zero-crossing point during each line cycle of the AC mains line voltage $V_{AC}$ in response to detecting edges of the three-wire zero-cross signal $V_{3WZC}$. The filter circuit 642 may introduce a phase delay in the filtered signal $V_F$ with respect to the AC mains line voltage $V_{AC}$. The signal generation circuit 644 may generate edges in the three-wire zero-cross signal $V_{3WZC}$ (e.g., drive the three-wire zero-cross signal $V_{3WZC}$ low towards circuit common) when the magnitude of the filtered voltage $V_F$ exceeds a predetermined threshold (e.g., the signal generation circuit 644 may be a simple zero-cross detect circuit). Because of the phase delay between the filtered signal $V_F$ and the AC mains line voltage $V_{AC}$, the edges of the three-wire zero-cross signal $V_{3WZC}$ that indicate the zero-crossing points of the AC mains line voltage $V_{AC}$ may be offset (e.g., delayed) from the actual zero-crossing points of the AC mains line voltage $V_{AC}$. The phase delay may be pre-determined. The control circuit 615 may be configured to store a value representing the phase delay in the memory 628 and process the three-wire zero-cross signal $V_{3WZC}$ by factoring in the phase delay to determine the actual times of the zero-crossing points of the AC mains line voltage $V_{AC}$.

When operating in the two-wire mode, the power supply 620 may conduct a charging current through the lighting load 602 when the controllably conductive device 610 is non-conductive each half-cycle. When the control circuit 615 is controlling the intensity of the lighting load 602 to the high-end intensity $L_{HE}$, the power supply 620 may have the smallest amount of time to charge each half-cycle of all points along the dimming range of the load control device 600. In some examples (e.g., when controlling the intensity of the lighting load 602 near the high-end intensity $L_{HE}$), the power supply 620 may not be able to conduct enough charging current through certain types of lighting loads while the controllably conductive device 610 is non-conductive in order to adequately generate the first and second supply voltages $V_{CC1}$, $V_{CC2}$ (e.g., due to the impedances of the lighting loads). In some examples (e.g., when using the reverse phase-control dimming technique to control the FETs Q612, Q614 and/or when operating in the two-wire mode), some types of lighting loads may conduct even less charging current through the power supply 620 during the times when the controllably conductive device 610 is non-conductive.

The control circuit 615 may be configured to execute a plurality of different power supply protection techniques (e.g., when operating in the two-wire mode and/or when using the reverse phase-control dimming technique). The control circuit 615 may be configured to monitor the magnitude of the rectified voltage $V_{RECT}$ and/or the magnitude of the bus voltage $V_{BUS}$ to make sure that the power supply 620 is able to properly generate supply voltages (e.g., the first and second supply voltages $V_{CC1}$, $V_{CC2}$) for powering components of the load control device 600. When the magnitude of the rectified voltage $V_{RECT}$ and/or the magnitude of the bus voltage $V_{BUS}$ drop to a level that is unacceptable to guarantee continued operation of the power supply 620, the control circuit 615 may be configured to adjust how the control circuit is controlling the FETs Q612, Q614. For example, the control circuit 615 may be configured to adjust (e.g., reduce) the intensity of the lighting load 602 (e.g., to increase the amount of time that the power supply 620 is able to charge while the controllably conductive device 610 is non-conductive each half-cycle). As described herein, the intensity of the lighting load 602 may be adjusted (e.g., reduced) by adjusting a present phase angle $\theta_{PRES}$ of the controllably conductive device 610. Additionally or alternatively, the control circuit 615 may be configured to adjust (e.g., reduce) the high-end intensity $L_{HE}$ of the lighting load 602. Further, the control circuit 615 may determine that the power supply 620 may be able to charge more effectively through some types of lighting loads using the forward phase-control dimming technique. In response to such determination, the control circuit 615 may be configured to adjust the type of phase-control dimming technique being used to control the lighting load 602 (e.g., by changing from the reverse phase-control dimming technique to the forward phase-control dimming technique).

Figure 7:
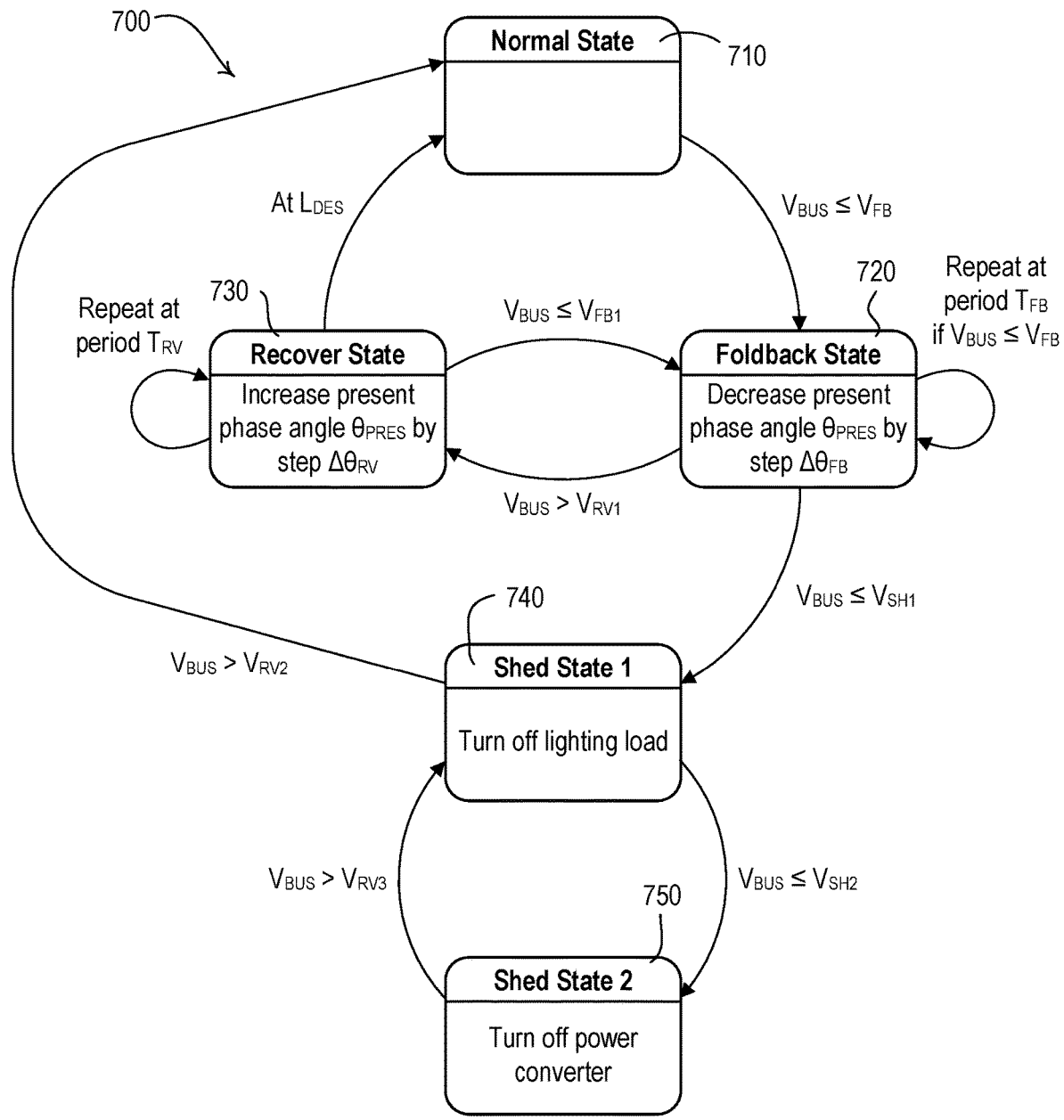
FIG. 7 is a state diagram illustrating the operation of a control circuit of a load control device during an example control procedure.

FIG. 7 is a state diagram illustrating the operation of a control circuit of a load control device (e.g., the control circuit 115 of the load control device 100 of FIG. 1 and/or the control circuit 615 of the load control device 600 of FIG. 6) during an example control procedure 700. During the control procedure 700, the control circuit may monitor the operation of a power supply (e.g., the power supplies 120, 620) to ensure that the power supply is able to generate one or more supply voltages (e.g., the first and second supply voltages $V_{CC1}$, $V_{CC2}$). When the power supply is able to appropriately generate the one or more supply voltages, the control circuit may operate in a normal mode 710. During the normal mode, the control circuit may adjust the intensity of a lighting load (e.g., the lighting loads 102, 602) to a desired intensity $L_{DES}$, for example, in response to actuations of one of more buttons of a user interface (e.g., the user interfaces 117, 617) and/or a message received via a communication circuit (e.g., the communication circuits 119, 619). The control circuit may be configured to monitor a magnitude of a bus voltage $V_{BUS}$ across a capacitor of the power supply (e.g., the bus voltage $V_{BUS}$ across the bus capacitor C625 shown in FIG. 6) to determine if the power supply is approaching a condition in which the power supply may not be able to appropriately generate the supply voltages. For example, the control circuit may monitor the magnitude of the bus voltage $V_{BUS}$ by periodically sampling the scaled bus voltage signal $V_{BUS-S}$ (e.g., as shown in FIG. 6).

The control circuit may be configured to adjust a present phase angle $\theta_{PRES}$ of a controllably conductive device (e.g., the controllably conductive device 110 and/or the controllably conductive device 610) in response to the magnitude of the bus voltage $V_{BUS}$. When the magnitude of the bus voltage $V_{BUS}$ drops to or below a foldback threshold $V_{FB}$ (e.g., approximately 70 volts), the control circuit may operate in a foldback mode 720 in which the control circuit may reduce the present phase angle $\theta_{PRES}$ by a foldback step $\Delta\theta_{FB}$ (e.g., approximately 0.7°). For example, the control circuit may be configured to periodically decrease the present phase angle $\theta_{PRES}$ by the foldback step $\Delta\theta_{FB}$ (e.g., a foldback amount) at a foldback period $T_{FB}$ (e.g., every 10 milliseconds) while the magnitude of the bus voltage $V_{BUS}$ is less than or equal to the foldback threshold $V_{FB}$ in the foldback mode 720. The control circuit may cease periodically decreasing the present phase angle $\theta_{PRES}$ by the foldback step $\Delta\theta_{FB}$ at the foldback period $T_{FB}$ when the magnitude of the bus voltage $V_{BUS}$ rises back above the foldback threshold $V_{FB}$. When the magnitude of the bus voltage $V_{BUS}$ rises above a first recovery threshold $V_{RV1}$ (e.g., approximately 85 volts) while in the foldback state, the control circuit may operate in a recovery mode 730 in which the control circuit may increase the present phase angle $\theta_{PRES}$ by a recovery step $\Delta\theta_{RV}$ (e.g., approximately 0.7°). For example, the control circuit may be configured to periodically increase the present phase angle $\theta_{PRES}$ by the recovery step $\Delta\theta_{RV}$ (e.g., a recovery amount) at a recovery period $T_{RV}$ (e.g., every 10 milliseconds) while in the recovery mode 730. If the control circuit increases the present phase angle $\theta_{PRES}$ such that the intensity of the lighting load is returned to the desired intensity $L_{DES}$, the control circuit may begin operating in the normal state 710 again. If the magnitude of the bus voltage $V_{BUS}$ drops to or below the foldback threshold $V_{FB}$ while in the recovery mode 730, the control circuit may return to the foldback mode 720.

While in the foldback mode 720, the control circuit may be configured to turn off the lighting load if the magnitude of the bus voltage $V_{BUS}$ falls even lower (e.g., despite the control circuit periodically decreasing the present phase angle $\theta_{PRES}$). For example, when the magnitude of the bus voltage $V_{BUS}$ drops to or below a first shed threshold $V_{SH1}$ (e.g., approximately 60 volts), the control circuit may operate in a first shed mode 740 during which the control circuit may turn off the lighting load. When the magnitude of the bus voltage $V_{BUS}$ rises above a second recovery threshold $V_{RV2}$ (e.g., approximately 75 volts) while in the first shed mode 740, the control circuit may return to the normal mode and may attempt to turn the lighting load back on to the desired intensity $L_{DES}$. The control circuit may be configured to store the desired intensity $L_{DES}$ in memory before turning off the lighting load so that the control circuit may turn the lighting load back on to the desired intensity $L_{DES}$ when returning to the normal mode.

If the magnitude of the bus voltage $V_{BUS}$ drops to or below a second shed threshold $V_{SH2}$ (e.g., approximately 45 volts) while in the first shed mode 740, the control circuit may begin to operate in a second shed mode 750 during which the control circuit may turn off one or more stages (e.g., one or more components) of the power supply (e.g., turn off the power converter circuit 626). If the magnitude of the bus voltage $V_{BUS}$ rises above a third recovery threshold $V_{RV3}$ (e.g., approximately 45 volts) while in the second shed mode 750, the control circuit may return to the first shed mode 740 and turn back on the one or more stages of the power supply. During the second shed mode 750, the magnitude of the bus voltage $V_{BUS}$ may continue to fall until the control circuit resets. After resetting, the control circuit may return to the normal state 710 and attempt to turn the lighting load back on to the desired intensity $L_{DES}$.

As previously mentioned, the power supply may be able to charge more effectively through some lighting loads when using the forward phase-control dimming technique rather than the reverse phase-control dimming technique. When executing the control procedure 700, the control circuit may repetitively turn the lighting load off and then back on (e.g., by entering the foldback mode 720, entering the first shed mode 740, and then returning to the normal mode 710), which may result in the lighting load blinking or flashing. The control circuit may be configured to determine when the lighting load is being repetitively turned off and then back on, and to change from using the reverse phase-control dimming technique to using the forward phase-control dimming technique.

Figure 8:
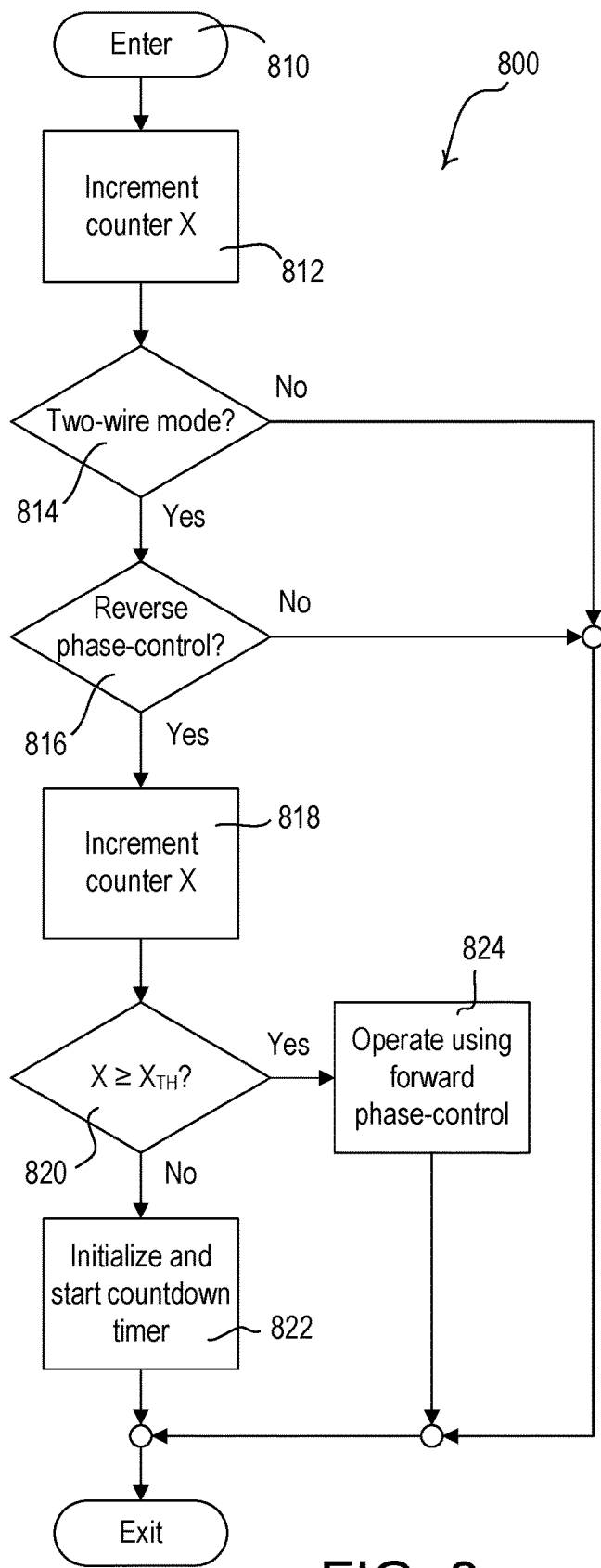
FIG. 8 is a flowchart of an example phase-control adjustment procedure that may be executed by a control circuit of a load control device.

FIG. 8 is a flowchart of an example phase-control adjustment procedure 800 that may be executed by a control circuit of a load control device (e.g., the control circuit 115 of the load control device 100 of FIG. 1 and/or the control circuit 615 of the load control device 600 of FIG. 6). For example, the control circuit may execute the phase-control adjustment procedure 800 at 810 each time that the control circuit enters the first shed mode 740 from the foldback mode 720 during the control procedure 700 shown in FIG. 7. When executing the phase-control adjustment procedure 800 while using the reverse phase-control dimming technique, the control circuit may use a counter X to keep track of how many times the lighting load is turned off in response to the magnitude of the bus voltage $V_{BUS}$ during a monitoring period $T_{MON}$ (e.g., which may be pre-configured). The control circuit may switch to the forward phase-control dimming technique if the counter X exceeds a threshold $X_{TH}$ (e.g., three). For example, the control circuit may decide (e.g., only decide) to automatically change from using the reverse phase-control dimming technique to using the forward phase-control dimming technique when the control circuit is operating in the two-wire mode (e.g., as determined in response to the neutral wire detect signal $V_{NWD}$).

At 812, the control circuit may first turn off the lighting load (e.g., when entering the first shed mode 740 from the foldback mode 720). If the control circuit is not operating in the two-wire mode at 814 (e.g., the control circuit is operating in the three-wire mode) or is not using the reverse phase-control dimming technique at 816, the phase-control adjustment procedure 800 may simply exit. If the control circuit is operating in the two-wire mode at 814 and is using the reverse phase-control dimming technique at 816, the control circuit may increment the counter X at 818 (e.g., by one). If the counter X is less than the threshold $X_{TH}$ at 820, the control circuit may initialize a countdown timer to the monitoring period $T_{MON}$ and start countdown timer counting down at 822, before the phase-control adjustment procedure 800 exits. If the countdown timer is already running at 822, the control circuit may simply reset the countdown time to the monitoring period $T_{MON}$. When the counter X is greater than or equal to the threshold $X_{TH}$ at 820, the control circuit may begin to operate using the forward phase-control technique at 824 and the phase-control adjustment procedure 800 may exit.

Figure 9:
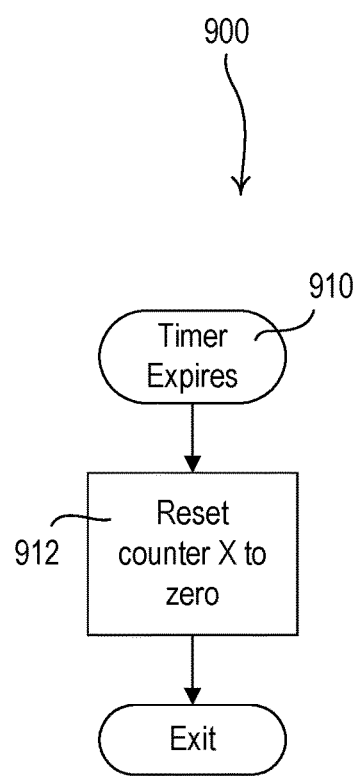
FIG. 9 is a flowchart of an example countdown timer procedure that may be executed by a control circuit of a load control device.

FIG. 9 is a flowchart of an example countdown timer procedure 900 that may be executed by a control circuit of a load control device (e.g., the control circuit 115 of the load control device 100 of FIG. 1 and/or the control circuit 615 of the load control device 600 of FIG. 6). For example, the control circuit may execute the countdown timer procedure 900 at 910 in response to the countdown timer that was started at 822 of the phase-control adjustment procedure 800. When the countdown timer expires at 910, the control circuit may reset the counter X to zero at 912 and the countdown timer procedure 900 may exit.

Figure 10:
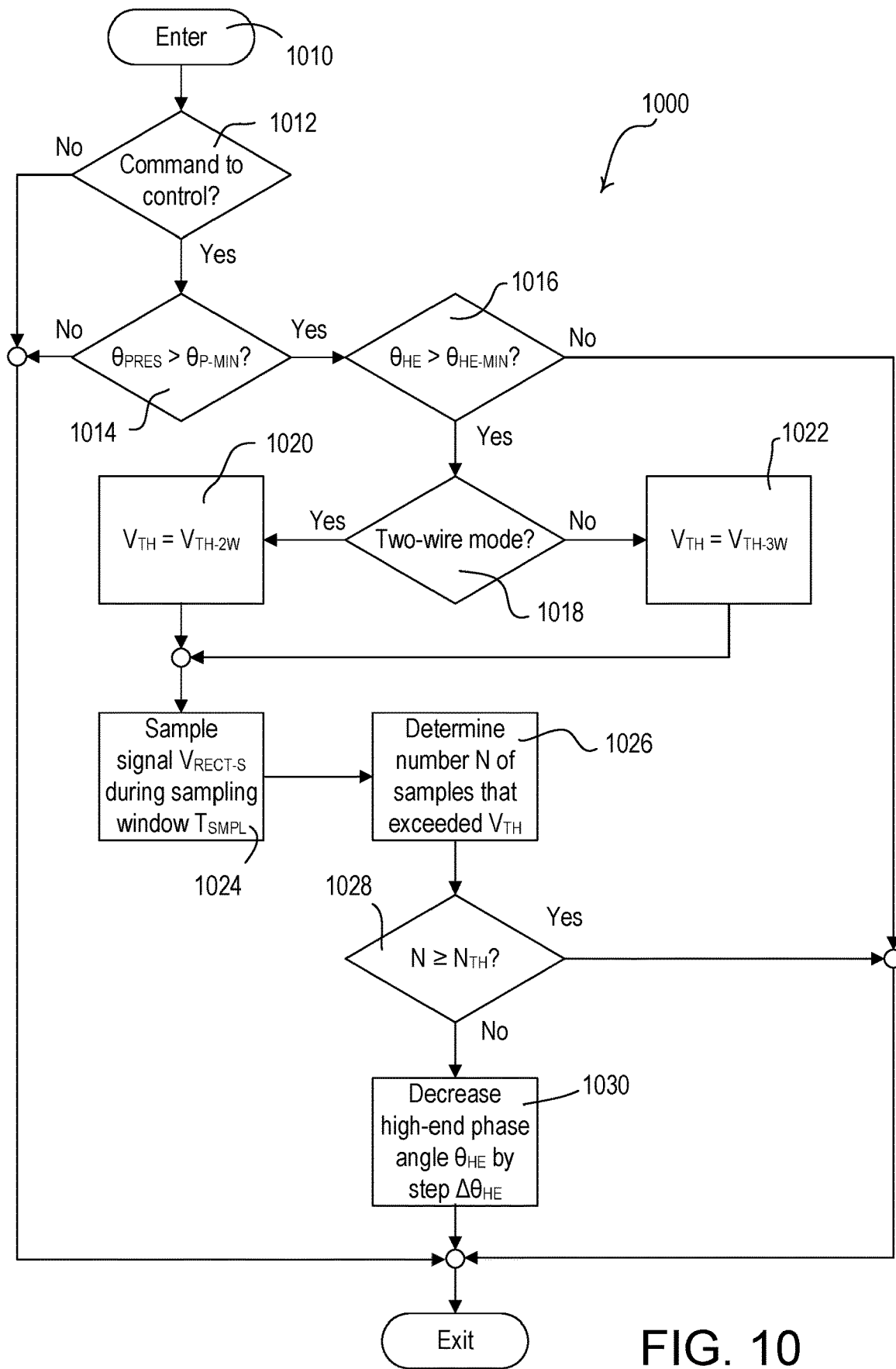
FIG. 10 is a flowchart of an example high-end trim adjustment procedure that may be executed by a control circuit of a load control device.

FIG. 10 is a flowchart of an example high-end trim adjustment procedure 1000 that may be executed by a control circuit of a load control device (e.g., the control circuit 115 of the load control device 100 of FIG. 1 and/or the control circuit 615 of the load control device 600 of FIG. 6). For example, the control circuit may execute the high-end trim adjustment procedure 1000 periodically (e.g., every 10 milliseconds) at 1010. The control circuit may execute the high-end trim adjustment procedure 1000 in addition to executing the procedure 700 shown in FIG. 7. During the high-end trim adjustment procedure 1000, the control circuit may monitor the operation of a power supply (e.g., the power supplies 120, 620) to ensure that the power supply is able to generate one or more supply voltages (e.g., the first and second supply voltages $V_{CC1}$, $V_{CC2}$). The control circuit may be configured to determine (e.g., within a short period of time) if the power supply is approaching a condition in which the power supply may not be able to appropriately generate the supply voltages by monitoring a magnitude of a rectified voltage $V_{RECT}$ that is received by the power supply (e.g., the rectified voltage $V_{RECT}$ shown in FIGS. 1 and 6). For example, the control circuit may sample a control signal that indicates the magnitude of the rectified voltage (e.g., the scaled rectified voltage signal $V_{RECT-S}$ shown in FIG. 6). Since the control circuit is responsive to the rectified voltage $V_{RECT}$ when executing the high-end trim adjustment procedure 1000, the control circuit may be more responsive to conditions in which the power supply may not be able to appropriately generate the supply voltages than if the control circuit was responsive to the bus voltage $V_{BUS}$ (e.g., as in the control procedure 700 shown in FIG. 7).

The control circuit may be configured to adjust (e.g., reduce) a high-end phase angle $\theta_{HE}$ (e.g., a high-end trim) of the load control device in response to the magnitude of the bus voltage $V_{BUS}$ during the high-end trim adjustment procedure 1000. The high-end phase angle $\theta_{HE}$ may define the high-end intensity $L_{HE}$ of the lighting load (e.g., the maximum intensity to which the control circuit may control the lighting load). The control circuit may not adjust the present phase angle $\theta_{PRES}$ above the high-end phase angle $\theta_{HE}$. Once the high-end phase angle $\theta_{HE}$ is reduced by the control circuit during the high-end trim adjustment procedure 1000, the high-end phase angle $\theta_{HE}$ may remain latched at the reduced level. For example, the high-end phase angle $\theta_{HE}$ may remain latched at the reduced level until power is cycled (e.g., power is disconnected and reconnected) to the load control device.

The control circuit may adjust the high-end phase angle $\theta_{HE}$ after receiving (e.g., only after receiving) a command to control the lighting load (e.g., via the user interfaces 117, 617 and/or the communication circuits 119, 619). For example, the control circuit may adjust the high-end phase angle $\theta_{HE}$ during an adjustment time period $T_{ADJ}$ (e.g., approximately 1500 milliseconds) after receiving a command to control the lighting load (e.g., after an actuation of one or more of the actuators of the user interfaces 117, 617). If the control circuit is not within the adjustment time period $T_{ADJ}$ from receiving the command to control the lighting load at 1012, the high-end trim adjustment procedure 1000 may simply exit. If the control circuit is within the adjustment time period $T_{ADJ}$ from receiving the command to control the lighting load at 1012, the control circuit may determine if the present phase angle $\theta_{PRES}$ is greater than a minimum phase angle $\theta_{P-MIN}$ (e.g., approximately 90°) at 1014. If the present phase angle $\theta_{PRES}$ is greater than the minimum phase angle $\theta_{P-MIN}$ at 1014, the control circuit may determine if the high-end phase angle $\theta_{HE}$ is greater than a minimum high-end phase angle $\theta_{HE-MIN}$ (e.g., approximately 105°) at 1016. If the present phase angle $\theta_{PRES}$ is not greater than the minimum phase angle $\theta_{P-MIN}$ at 1014 or not greater than the minimum high-end phase angle $\theta_{HE-MIN}$ at 1016, the high-end trim adjustment procedure 1000 may exit. If the high-end phase angle $\theta_{HE}$ is greater than the minimum high-end phase angle $\theta_{BE-MIN}$ at 1016, the control circuit may continue on to determine if the high-end phase angle $\theta_{HE}$ should be adjusted.

The control circuit may set a voltage threshold $V_{TH}$ for determining if the magnitude of the rectified voltage $V_{RECT}$ is at an unacceptable level based on whether the control circuit is operating in the two-wire mode or three-wire mode. For example, if the control circuit is operating in the two-wire mode at 1018, the control circuit may, at 1020, set the voltage threshold $V_{TH}$ equal to a two-wire threshold $V_{TH-2W}$ (e.g., approximately 83 volts). Detecting that the magnitude of the scaled rectified voltage signal $V_{RECT-S}$ has dropped below the two-wire threshold $V_{TH-2W}$ may indicate a condition in which the power supply may not be able to appropriately generate the supply voltages. If the control circuit is not operating in the two-wire mode at 1018 (e.g., is operating in the three-wire mode), the control circuit may, at 1022, set the voltage threshold $V_{TH}$ equal to a three-wire threshold $V_{TH-3W}$ (e.g., approximately 40 volts). Detecting that the magnitude of the scaled rectified voltage signal $V_{RECT-S}$ has dropped below the three-wire threshold $V_{TH-3W}$ may indicate a condition in which one or more other circuits of the load control device may be able to operate properly.

At 1024, the control circuit may sample the scaled rectified voltage signal $V_{RECT-S}$ during a sampling window $T_{SMPL}$ (e.g., 1.5 milliseconds). For example, the control circuit may periodically sample the scaled rectified voltage signal $V_{RECT-S}$ a number M times (e.g., 10 times) over the length of the sampling window $T_{SMPL}$. When using the forward phase-control dimming technique, the sampling window $T_{SMPL}$ may occur before (e.g., immediately before) the firing time when a controllably conductive device (e.g., the controllably conductive devices 110, 610) is rendered conductive. When using the reverse phase-control dimming technique, the sampling window $T_{SMPL}$ may occur after (e.g., immediately after) the firing time when the controllably conductive device is rendered non-conductive. At 1026, the control circuit may determine a number N of samples from the sampling window $T_{SMPL}$ that exceed the voltage threshold $V_{TH}$ (e.g., as determined at 1020 and 1022). If the number N of samples that exceed the voltage threshold $V_{TH}$ is greater than or equal to a threshold $N_{TH}$ (e.g., seven) at 1028, the high-end trim adjustment procedure 1000 may exit. If the number N of samples that exceed the voltage threshold $V_{TH}$ is not greater than or equal to the threshold $N_{TH}$ at 1028, the control circuit may decrease the high-end phase angle $\theta_{HE}$ by a high-end reduction step $\Delta\theta_{HE}$ (e.g., approximately 0.7°) at 1030, before the high-end trim adjustment procedure 1000 exits. For example, the control circuit may be configured to periodically decrease the high-end phase angle $\theta_{HE}$ by the high-end reduction step $\Delta\theta_{HE}$ every 10 milliseconds (e.g., every time the high-end trim adjustment procedure 1000 is executed).

Although features and elements are described herein in particular combinations, each feature or element can be used alone or in any combination with the other features and elements. For example, the functionality described herein may be described as being performed by a load control device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An electrical load controller operatively couplable to an alternating current (AC) power source, comprising:
   memory circuitry;
   a controllably conductive device couplable between the AC power source and an electrical load device;
   communications interface circuitry; and
   control circuitry communicatively coupled to the memory circuitry and the communications interface circuitry, the control circuitry to:
   detect a type of connection linking the controllably conductive device to the AC power source;
   responsive to detection of a three-wire connection between the controllably conductive device and the AC power source, phase control power delivery of the AC power source by reversibly transitioning the controllably conductive device between CONDUCTIVE and NONCONDUCTIVE states based on a zero-cross signal received from operatively coupled three-wire zero cross detection circuitry; and responsive to detection of a two-wire connection between the controllably conductive device couples to an AC power source, phase control power delivery of the AC power source by reversibly transitioning the controllably conductive device between CONDUCTIVE and NONCONDUCTIVE states based on a zero-cross signal received from operatively coupled two-wire zero cross detect circuitry.

2. The electrical load controller of claim 1, the control circuitry to further:
retrieve from the memory circuitry data representative of a zero cross signal delay value from the three-wire zero cross detection circuitry; and
determine an actual zero cross time based on subtracting the zero cross signal delay value from the received three-wire zero cross detection circuitry.

3. The electrical load controller of claim 1, the control circuitry to further:
detect a parameter of the electrical load device coupled to the controllably conductive device; and
responsive to detection of the electrical load device parameter, provide either a forward phase-controlled AC power to the controllably conductive device or a reverse phase-controlled AC power to the controllably conductive device.

4. The electrical load controller of claim 3, wherein to detect the parameter of the electrical load device, the control circuitry to further:
provide reverse phase-controlled AC power to the electrical load device;
receive a voltage feedback signal from the electrical load device;
determine whether the voltage feedback signal is indicative of an overvoltage condition at the electrical load device;
responsive to the determination that an overvoltage condition exists at the electrical load device responsive to provision of the reverse phase-controlled AC power to the electrical load device:
associate the electrical load device with an inductive electrical load device; and
provide forward phase-controlled AC power to the electrical load device.

5. The electrical load controller of claim 4, wherein to detect the parameter of the electrical load device, the control circuitry to further:
responsive to the determination that an overvoltage condition does not exist at the electrical load device responsive to provision of the reverse phase-controlled AC power to the electrical load device:
associate the electrical load device with a capacitive electrical load device; and
maintain reverse phase-controlled AC power to the electrical load device.

6. The electrical load controller of claim 1 wherein to detect the type of connection linking the controllably conductive device to the AC power source, the control circuitry to further:
detect a number of transitions in a signal provided by operatively coupled neutral wire detect circuitry that occur within a defined number of cycles of the AC power source;
determine whether the detected number of transitions in the signal provided by the neutral wire detect circuitry exceed a defined threshold number of transitions;
responsive to the determined number of transitions equaling or exceeding the defined threshold number of transitions, associate the controllably conductive device with a three-wire connection; and
responsive to the determined number of transitions not exceeding the defined threshold number of transitions, associate the controllably conductive device with a two-wire connection.

7. A method of controlling an electrical load device, comprising:
detecting, by electrical load controller control circuitry operatively coupled to a controllably conductive device, a type of connection linking the controllably conductive device to an AC power source;
causing, by the control circuitry, the controllably conductive device to reversibly transition between CONDUCTIVE and NONCONDUCTIVE states based on a zero-cross signal received from operatively coupled three-wire zero cross detection circuitry responsive to detection of a three-wire connection between the controllably conductive device and the AC power source; and
causing, by the control circuitry, the controllably conductive device to reversibly transition between CONDUCTIVE and NONCONDUCTIVE states based on a zero-cross signal received from operatively coupled two-wire zero cross detect circuitry responsive to detection of a two-wire connection between the controllably conductive device and the AC power source.

8. The method of claim 7, further comprising:
retrieving, by the control circuitry from communicatively coupled memory circuitry, data representative of a zero cross signal delay value from the three-wire zero cross detection circuitry; and
determining, by the control circuitry, an actual zero cross time based on subtracting the zero cross signal delay value from the received three-wire zero cross detection circuitry.

9. The method of claim 7, further comprising:
detecting, by the control circuitry, a parameter of the electrical load device coupled to the controllably conductive device; and
providing, by the control circuitry, responsive to detection of the electrical load device parameter, one of:
a forward phase-controlled AC power to the controllably conductive device; or
a reverse phase-controlled AC power to the controllably conductive device.

10. The method of claim 9 wherein detecting the parameter of the electrical load device further comprises:
providing, by the control circuitry, reverse phase-controlled AC power to the electrical load device;
receiving, by the control circuitry, a voltage feedback signal from the electrical load device;
determining, by the control circuitry, whether the voltage feedback signal is indicative of an overvoltage condition at the electrical load device;
responsive to the determination that an overvoltage condition exists at the electrical load device responsive to provision of the reverse phase-controlled AC power to the electrical load device:
associating, by the control circuitry, the electrical load device with an inductive electrical load device; and
providing, by the control circuitry, forward phase-controlled AC power to the electrical load device.

11. The method of claim 10, wherein detecting the parameter of the electrical load device further comprises:
responsive to the determination that an overvoltage condition does not exist at the electrical load device responsive to provision of the reverse phase-controlled AC power to the electrical load device:
associating, by the control circuitry, the electrical load device with a capacitive electrical load device; and
maintaining, by the control circuitry, reverse phase-controlled AC power to the electrical load device.

12. The method of claim 7 wherein detecting the type of connection linking the controllably conductive device to the AC power source further comprises:
detecting, by the control circuitry, a number of transitions in a signal provided by operatively coupled neutral wire detect circuitry that occur within a defined number of cycles of the AC power source;
determining, by the control circuitry, whether the detected number of transitions in the signal provided by the neutral wire detect circuitry exceed a defined threshold number of transitions;
associating, by the control circuitry, the controllably conductive device with a three-wire connection responsive to the determined number of transitions equaling or exceeding the defined threshold number of transitions; and
associating, by the control circuitry, the controllably conductive device with a two-wire connection responsive to the determined number of transitions not exceeding the defined threshold number of transitions.

13. A non-transitory, machine-readable, storage device that includes instructions that, when executed by electrical load controller control circuitry, cause the electrical load controller control circuitry to:
detect a type of connection linking an operatively coupled controllably conductive device to an AC power source;
cause the controllably conductive device to reversibly transition between CONDUCTIVE and NONCONDUCTIVE states based on a zero-cross signal received from operatively coupled three-wire zero cross detection circuitry responsive to detection of a three-wire connection between the controllably conductive device and the AC power source; and
cause the controllably conductive device to reversibly transition between CONDUCTIVE and NONCONDUCTIVE states based on a zero-cross signal received from operatively coupled two-wire zero cross detect circuitry responsive to detection of a two-wire connection between the controllably conductive device and the AC power source.

14. The non-transitory, machine-readable, storage device of claim 13 wherein the instructions, when executed by the electrical load controller control circuitry, further cause the electrical load controller control circuitry to:
retrieve from communicatively coupled memory circuitry, data representative of a zero cross signal delay value from the three-wire zero cross detection circuitry; and
determine an actual zero cross time based on subtracting the zero cross signal delay value from the received three-wire zero cross detection circuitry.

15. The non-transitory, machine-readable, storage device of claim 13 wherein the instructions, when executed by the electrical load controller control circuitry, further cause the electrical load controller control circuitry to:
detect a parameter of the electrical load device coupled to the controllably conductive device; and
provide, responsive to detection of the electrical load device parameter, one of:
a forward phase-controlled AC power to the controllably conductive device; or
a reverse phase-controlled AC power to the controllably conductive device.

16. The non-transitory, machine-readable, storage device of claim 15 wherein the instructions that cause the electrical load controller control circuitry to detect the parameter of the electrical load device further cause the electrical load controller control circuitry to:
provide reverse phase-controlled AC power to the electrical load device;
receive a voltage feedback signal from the electrical load device;
determine whether the voltage feedback signal is indicative of an overvoltage condition at the electrical load device;
responsive to the determination that an overvoltage condition exists at the electrical load device responsive to provision of the reverse phase-controlled AC power to the electrical load device:
associate the electrical load device with an inductive electrical load device; and
provide forward phase-controlled AC power to the electrical load device.

17. The non-transitory, machine-readable, storage device of claim 16 wherein the instructions that cause the electrical load controller control circuitry to detect the parameter of the electrical load device further cause the electrical load controller control circuitry to:
responsive to the determination that an overvoltage condition does not exist at the electrical load device responsive to provision of the reverse phase-controlled AC power to the electrical load device:
associate the electrical load device with a capacitive electrical load device; and
maintain reverse phase-controlled AC power to the electrical load device.

18. The non-transitory, machine-readable, storage device of claim 13 wherein the instructions that cause the electrical load controller control circuitry to detect the type of connection linking the controllably conductive device to the AC power source further cause the electrical load controller control circuitry to:
detect a number of transitions in a signal provided by operatively coupled neutral wire detect circuitry that occur within a defined number of cycles of the AC power source;
determine whether the detected number of transitions in the signal provided by the neutral wire detect circuitry exceed a defined threshold number of transitions;
associate the controllably conductive device with a three-wire connection responsive to the determined number of transitions equaling or exceeding the defined threshold number of transitions; and
associate the controllably conductive device with a two-wire connection responsive to the determined number of transitions not exceeding the defined threshold number of transitions.

* * * * *